US010890706B2

(12) United States Patent
Shinohara et al.

(10) Patent No.: US 10,890,706 B2
(45) Date of Patent: Jan. 12, 2021

(54) OPTICAL DEVICE

(71) Applicant: OMRON Corporation, Kyoto (JP)

(72) Inventors: Masayuki Shinohara, Kyoto (JP);
Yasuhiro Tanoue, Shiga (JP);
Norikazu Kitamura, Osaka (JP);
Mitsuru Okuda, Aichi (JP); Kazuyuki Okada, Shiga (JP); Norihisa Kanzaki, Shiga (JP); Takuma Iwase, Shiga (JP)

(73) Assignee: Omron Corporation, Kyoto (JP)

( * ) Notice: Subject to any disclaimer, the term of this patent is extended or adjusted under 35 U.S.C. 154(b) by 391 days.

(21) Appl. No.: 15/808,695

(22) Filed: Nov. 9, 2017

(65) Prior Publication Data

US 2018/0067248 A1     Mar. 8, 2018

Related U.S. Application Data

(63) Continuation of application No. PCT/JP2016/057212, filed on Mar. 8, 2016.

(30) Foreign Application Priority Data

Jul. 29, 2015   (JP) .................................. 2015-150035

(51) Int. Cl.
*F21V 8/00*     (2006.01)
(52) U.S. Cl.
CPC ........... *G02B 6/0036* (2013.01); *G02B 6/003* (2013.01); *G02B 6/006* (2013.01)
(58) Field of Classification Search
CPC ...... G02B 6/0036; G02B 6/003; G02B 6/006; G02B 36/56; G02B 36/08; G02B 5/18
See application file for complete search history.

(56) References Cited

U.S. PATENT DOCUMENTS 6,144,480 A    11/2000  Li et al.
6,638,582 B1 * 10/2003  Uchiyama ............ G02B 5/3083
                                                       428/1.2
(Continued)

FOREIGN PATENT DOCUMENTS

CN     102395915 A    3/2012
CN     104460115 A    3/2015
(Continued)

OTHER PUBLICATIONS

International Search Report issued in corresponding Application No. PCT/JP2016/057212, dated Apr. 12, 2016 (2 pages).
(Continued)

*Primary Examiner* — Ryan A Lepisto
*Assistant Examiner* — Erin D Chiem
(74) *Attorney, Agent, or Firm* — Osha Bergman Watanabe & Burton LLP

(57) ABSTRACT

An optical device has a light guide plate configured to guide light within a plane parallel to an emission surface thereof, and a plurality of optical deflectors arranged two-dimensionally within a plane parallel to the emission surface. Each of the optical deflectors deflects light propagating through the light guide plate, and causes the emission surface to output light forming an image in a space. Each of the optical deflectors is configured to spread the light incident thereon that has an intensity distribution corresponding to an image in a direction orthogonal to the light guide direction of the light guide plate in a plane parallel to the emission surface, and cause the emission surface to output the light which groups the light from the plurality of optical deflectors arranged along a direction orthogonal to the light guide direction, such that light radiating from the image is formed.

20 Claims, 29 Drawing Sheets

(56) References Cited

U.S. PATENT DOCUMENTS

| | | | |
|---|---|---|---|
| 8,743,464 B1* | 6/2014 | Amirparviz | G02B 27/01 359/633 |
| 2007/0279391 A1 | 12/2007 | Marttila et al. | |
| 2012/0033442 A1 | 2/2012 | Kamikatano et al. | |
| 2014/0268327 A1 | 9/2014 | Dunn et al. | |
| 2017/0363794 A1 | 12/2017 | Wan et al. | |

FOREIGN PATENT DOCUMENTS

| | | | |
|---|---|---|---|
| JP | 2000510603 A | 8/2000 | |
| JP | 2001-052128 A | 2/2001 | |
| JP | 2001-255493 A | 9/2001 | |
| JP | 2008275922 A | 11/2008 | |
| JP | 2009540440 A | 11/2009 | |
| JP | 2012-008464 A | 1/2012 | |
| JP | 2014-098873 A | 5/2014 | |

OTHER PUBLICATIONS

Written Opinion issued in corresponding Application No. PCT/JP2016/057212, dated Apr. 12, 2016 (4 pages).

* cited by examiner

OPTICAL DEVICE

BACKGROUND

Field

The present invention relates to an optical device.

Related Art

Stereoscopic displays are known. A stereoscopic display is equipped with a light guide plate and a light source placed at an edge of the light guide plate, and depending on whether the display uses a parallax barrier or a lens array, a mask or a lens array provided at the front surface of the light guide plate (e.g., Japanese Patent Publication No. 2012-008464). A display device that presents a two dimensional image stereoscopically is also known. More specifically, the display device is made up of a display unit provided with an image display surface that shows a two dimensional image, and a microlens array separated from the image display surface. The light emitted from the image display surface creates an image in an image forming plane located on the side of the display unit opposite the microlens array, and thus presents the two dimensional image stereoscopically (e.g., Japanese Patent Publication No. 2001-255493).

SUMMARY

Existing devices require some kind of optical component, e.g., a mask or a lens array to show a three-dimensional image. The optical components such as the mask or lens array must be closely aligned with other optical components such as the light guide plate, or the color liquid crystal display device, or the like in order to clearly show a three-dimensional image. Furthermore, it tends to be difficult to provide more situations where the light guide plate may be used to present a three-dimensional image.

In a first embodiment, an optical device includes a light guide plate configured to guide light within a plane parallel to an emission surface; and a plurality of optical deflectors arranged two-dimensionally within a plane parallel to the emission surface, the optical deflectors each deflecting light propagating through the light guide plate and causing the emission surface to output light forming an image in a space; wherein each optical deflector in the plurality of optical deflectors is configured to spread the light incident thereon that has an intensity distribution corresponding to an image in a direction orthogonal to the light guide direction of the light guide plate in a plane parallel to the emission surface and cause the emission surface to output said light which groups the light from the plurality of optical deflectors arranged along a direction orthogonal to the light guide direction and thereby produces light radiating from the image.

In a second embodiment, an optical device includes a light guide plate configured to guide light within a plane parallel to an emission surface; and a plurality of optical deflectors arranged two-dimensionally within a plane parallel to the emission surface, the optical deflectors each deflecting light propagating through the light guide plate and causing the emission surface to output light forming an image in a space; wherein each optical deflector in the plurality of optical deflectors configured to spread the light incident thereon that has an intensity distribution corresponding to the image two-dimensionally and cause the emission surface to output said light which groups the light from three or more optical deflectors on different straight lines and thereby produces light radiating from the image.

The optical device may be configured so that each optical deflector in the plurality of optical deflectors is provided with a single group or a plurality of groups of reflective, refractive, or diffractive deflection surface on the surface or inside the light guide plate and inclined relative to the emission surface.

At least one of the deflection surfaces may be configured to include a plurality of planar or curved surfaces oriented in different directions.

At least one of said deflection surfaces may be configured to extend in a direction orthogonal to the light guide direction of the light guide plate and have polygonal lines or curved lines when projected onto a plane parallel to the emission surface.

At least a portion of the plurality of optical deflectors may be configured to include a plurality of deflection surfaces extending linearly when the optical deflector is projected onto a plane parallel to the emission surface.

At least a portion of the plurality of optical deflectors may be configured to include a plurality of deflection surfaces extending along a curve and one or more linear deflection surfaces when the optical deflector is projected onto a plane parallel to the emission surface.

At least a portion of the plurality of optical deflectors may be configured to include a deflection surface forming a part of a Fresnel lens arranged at a location corresponding to the image.

At least a portion of the plurality of optical deflectors may be configured to include one or more deflection surfaces having a shape following an arc when the optical deflector is projected onto a plane parallel to the emission surface.

The plurality of deflection surfaces may be formed uniformly for the most part on the emission surface or a surface opposite the emission surface of the light guide plate, the deflection surfaces configured to spread light incident thereon in a range containing the image and cause the emission surface to output said light; and the optical device further including: a photo-reflective material provided on a portion of the plurality of deflection surfaces uniformly provided; and the plurality of uniformly formed deflection surfaces which are provided with the reflective material form the at least one portion of the plurality of optical deflectors.

The optical device may further include an optical component configured to include at least a portion of the plurality of optical deflectors, and arranged on the emission surface or a surface opposite the emission surface.

The plurality of deflection surfaces may be formed uniformly for the most part on the emission surface or a surface opposite the emission surface of the light guide plate, the deflection surfaces configured to spread light incident thereon in a range containing the image and cause the emission surface to output said light; and the optical device further including: an optical component having a refractive index substantially identical to the refractive index of the light guide plate, and configured with a surface in contact with a portion of the plurality of uniformly formed deflection surfaces; and the plurality of uniformly provided deflection surfaces not in contact with the surface of the optical component form the at least one portion of the plurality of optical deflectors.

At least a portion of the plurality of optical deflectors may be configured to include a deflection surface having a shape following an arc with a center of curvature toward the light source when the optical deflector is projected onto a plane parallel to the emission surface.

A light source may also be provided.

Note that the above summary does not list all the features of the present invention. Sub combinations of these sets of features are also within the scope of the invention.

DETAILED DESCRIPTION

Embodiments of the present invention are described below with reference to the drawings. However, the below embodiments are not limiting on the present invention. Not all combinations of the features described in the below embodiments are required. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
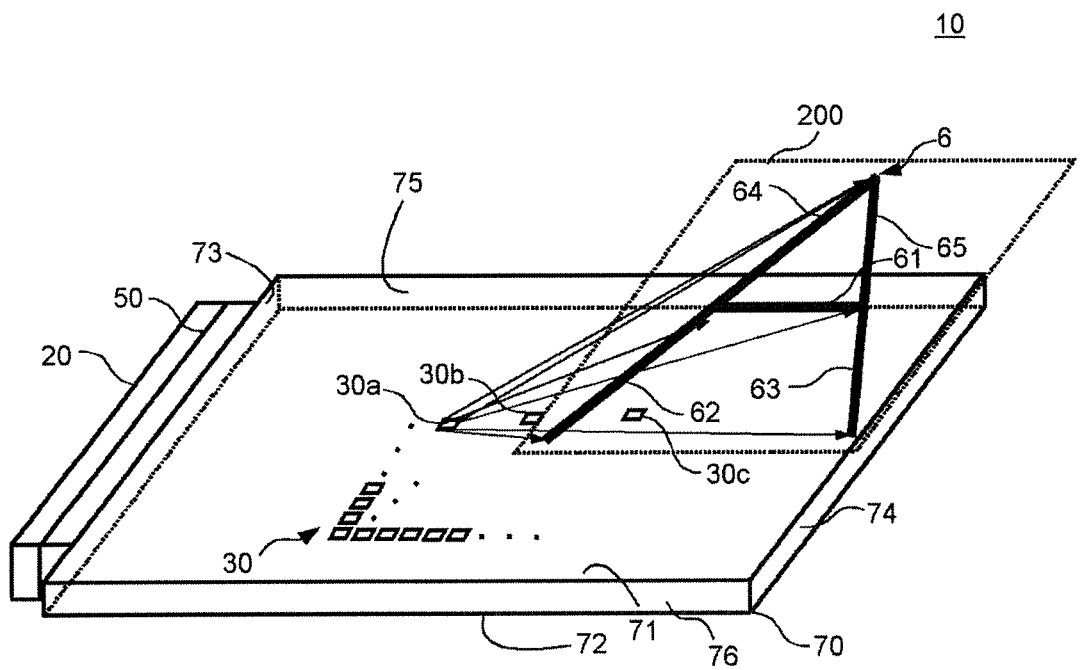
FIG. 1 schematically illustrates an optical device (display device 10) according to one or more embodiments of the present invention, and an image formed in a space.
Figure 1:
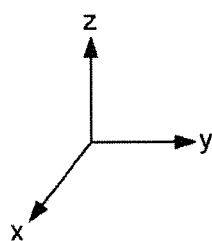

FIG. 1 schematically illustrates an optical device (display device 10) according to one or more embodiments of the present invention, and an image formed in a space. The drawings used for describing one or more embodiments of the present invention may be general and schematic in nature in order to provide a clear explanation. In some cases, the drawings are not to scale. The drawings that include a three-dimensional image are not necessarily drawn from the point of view of an observer and may be drawn from a different perspective to ensure the location the image in a space is easy to understand.

The display device 10 includes an emission surface 71 that emits light. The display device 10 uses light emitted from the emission surface 71 to produce a three-dimensional image 6 in a space. A user can perceive the image 6 as a three-dimensional image. Note that, the term three-dimensional image refers to an image that appears to be at a location that is different from the emission surface 71 of the display device 10. The term three-dimensional image also includes a two-dimensional image perceived at a location away from the emission surface 71 of the display device 10, for instance. In other words the term "three-dimensional image" does not refer only to an image perceived as having a solid shape, but also includes an image in two-dimensional form perceived at a different location than on the display surface of the display device 10. In one or more embodiments of the present invention, the three-dimensional image 6 is an image of the character "A" in a plane 200 located on the positive side of the z axis from the emission surface 71. The plane 200 is parallel to the xy plane.

The display device 10 is provided with a light guide plate 70, a light source 20, and a light-incidence tuning portion 50. The light guide plate 70 is a transparent resin material with a relatively high index of refraction. The light guide plate 70 may be produced from, for instance, a polycarbonate resin (PC), a poly methyl methacrylate resin (PMMA), glass or the like.

The light guide plate 70 includes an emission surface 71, and a rear surface 72 on the opposite side of the emission surface 71. The light guide plate 70 also includes edges on the four sides thereof, i.e. a first edge 73, a second edge 74, a third edge 75, and a fourth edge 76. The second edge 74 is opposite the first edge 73. The fourth edge 76 is opposite the third edge 75. Light from the light source 20 enters the light guide plate 70 via the first edge 73. The light guide plate 70 guides light from the light source 20 such that the light spreads out in planar form in a plane parallel to the emission surface 71.

The rectangular coordinate system, and in particular the right-handed system of x axis, y axis, and z axis is used at some points to describe one or more of the embodiments. Here the z axis direction is a direction perpendicular to the emission surface 71. The positive z axis direction is defined as the direction from the rear surface 72 to the emission surface 71. The y axis direction is a direction perpendicular to the first edge 73. The positive y axis direction is defined as the direction from the first edge 73 to the second edge 74. The x axis direction is the direction perpendicular to the third edge 75 and the fourth edge 76; and the positive x axis direction is defined as the direction from the third edge 75 to the fourth edge 76. To avoid redundancy in the description, planes parallel to the xy, yz, and xz planes are sometimes referred to as the xy plane, yz plane, and the xz plane, respectively.

The light source 20 may include a light emitting diode (LED). Light from the light source 20 is adjusted by the light-incidence tuning portion 50 and enters the light guide plate 70 via the first edge 73 as incidence light.

A plurality of optical deflectors 30 is provided on the rear surface 72 of the light guide plate 70 located at mutually different positions. The plurality of optical deflectors 30 includes, for example, an optical deflector 30a, an optical deflector 30b, an optical deflector 30c, and the like. The optical deflectors 30 may be provided two-dimensionally within the xy plane. For instance, the optical deflectors 30 may be provided as a matrix in the xy plane. Light guided by the light guide plate 70 enters the optical deflectors 30.

The optical deflector 30a, the optical deflector 30b, and the optical deflector 30c each deflect light traveling through the light guide plate 70 and each causes the light exiting from the emission surface 71 to draw the three-dimensional image 6. More specifically, the optical deflector 30a causes the emission surface 71 to output light bound for various locations in the three-dimensional image 6. The optical deflector 30a deflects the light guided thereto by the light guide plate 70 such that the light spreads out in the xy plane and the yz plane and travels toward various locations in the three-dimensional image 6. FIG. 1 illustrates a state where light from the optical deflector 30a spread out toward a number of locations in the three-dimensional image 6. The optical deflector 30b and the optical deflector 30c along with other optical deflectors 30 [in the optical deflector 30] each behave identically. Each of the optical deflectors 30 fills a microscopic area on the rear surface 72. Each of the optical deflectors 30 is a smaller surface area than when projected on the three-dimensional image 6 in the xy plane. The three-dimensional image 6 is created from the light spreading out from each optical deflector 30 among a multitude of optical deflectors 30 toward various locations in the three-dimensional image 6. That is, the light from many optical deflectors 30 produces the light that radiates from the direction of the three-dimensional image 6. Note that the light that creates the three-dimensional image 6 may be provided by at least three optical deflectors 30 that are not along the same straight line. That is, each of the optical deflectors 30 converts light entering therein into light with an intensity distribution according to the three-dimensional image 6 that spreads out two-dimensionally and exits from the emission surface. Thus, the light from the three or more optical deflectors 30 that are not on the same straight line forms the three-dimensional image 6. The display device 10 is thereby able to project a three-dimensional image into a space. The display device 10 gathers the light beams from the plurality of optical deflectors 30 that are not on the same straight line to provide an observer with light beams that radiate from the three-dimensional image 6. An observer is therefore able to perceive the three-dimensional image 6 regardless of whether the image is viewed from the x axis direction or the y axis direction.

Figure 2:
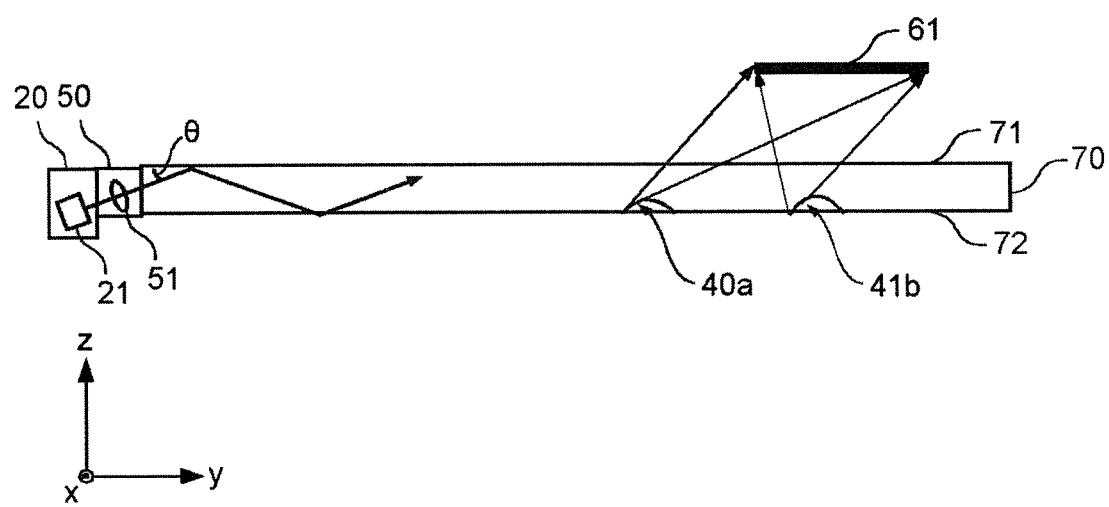
FIG. 2 schematically illustrates a cross section in the yz plane of the display device 10.
Figure 3:
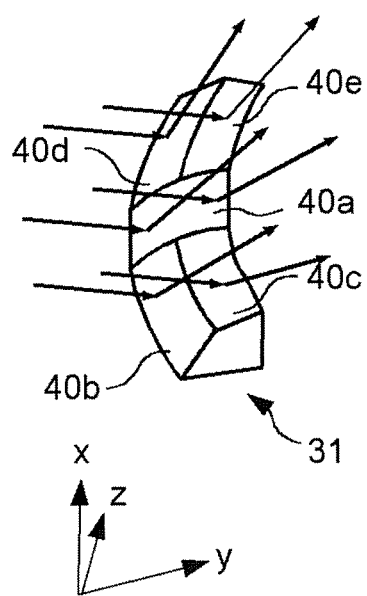
FIG. 3 schematically illustrates one example of an optical element 31 included in an optical deflector 30.

FIG. 2 schematically illustrates a cross section in the yz plane of the display device 10; FIG. 3 schematically illustrates one example of an optical element 31 included in an optical deflector 30.

The light source 20 may include an LED 21. A plurality of the LEDs 21 is arranged along the x axis direction. The optical axis of the light emitted from the LEDs 21 form an angle θ with the emission surface 71. For example, the optical axis of the light emitted from the LEDs 21 may form a narrow angle θ of approximately 20° with the emission surface 71. The light emitted from the LEDs 21 enters the light-incidence tuning portion 50.

The light-incidence tuning portion 50 includes lenses 51. The lenses 51 arranged along the x axis direction are respectively paired to an LED 21 in the plurality of LEDs 21. Each of the lenses 51 reduces the spread of light traveling along the optical axis of the light emitted from the LED 21 corresponding thereto. The lenses 51 causes the light emitted from the LEDs 21 to approach parallel light. The lenses 51 may reduce the spread angle of the light emitted from the LEDs 21 in the xy plane. The lenses 51 may also reduce the spread angle of the light emitted from the LEDs 21 in the yz plane. Hereby, light approaching parallel light enters the light guide plate 70.

Hereby the light beams within the xy plane guided by the light guide plate 70 and passing through locations in the light guide plate 70 spread out at an angle of predetermined value and advance from the locations in the light guide plate 70 about a direction connecting the locations in the light guide plate 70 and the light source 20. In this disclosure, the light that spreads from a certain point when light beams pass through the certain point inside or outside the light guide plate and advances is considered to have been output from that point, and is simply referred to as "the spread of light" or the like. The angle of this spread of light is referred to simply as the "spread angle". In a light intensity distribution along an angular direction, the spread angle may be the position at which the light intensity is half the maximum (full width at half maximum). The spread angle of light guided by the light guide plate 70 may be less than or equal to 5°. The spread angle of light may ideally be less than 1°. When projected onto the xy plane, the spread angle of the light may be less than or equal to 5° and ideally may be less than 1°. When projected onto the yz plane, the spread angle of the light may be less than or equal to 5° and ideally may be less than 1°.

As illustrated in FIG. 2 and FIG. 3, the optical deflector 30a includes a reflection surface 40a. The optical deflector 30a also includes reflection surface 40a, reflection surface 40b, reflection surface 40c, reflection surface 40d, and reflection surface 40e. The reflection surface 40 is an example of an optical surface functioning as a deflection surface that deflects light. The reflection surface 40a, reflection surface 40b, reflection surface 40c, reflection surface 40d, and reflection surface 40e are curved surfaces oriented in different directions. As above described, the optical axis of the LEDs 21 are inclined at an angle θ in the yz plane relative to the emission surface 71. Therefore, even when the light entering the light guide plate 70 approaches parallel light, a greater amount of light is repeatedly reflected by and propagated between the emission surface 71 and the rear surface 72 in the light guide plate 70 compared to when the optical axis of incident light that is parallel to the y axis. Consequently, a greater amount of light strikes the reflection surface 40 compared to when the optical axis of incident light is parallel to the y axis.

The reflection surface 40a causes light incident thereon to be emitted from the emission surface 71 at a different emission angle according to where the light is incident on the reflection surface 40a. The reflection surface 40a causes incident thereon to spread within an area 61 in the three-dimensional image 6. In one or more embodiments of the present invention, the area 61 is an area parallel to the y axis. The light reflecting from the reflection surface 40a is oriented from the reflection surface 40a toward where the area 61 exists, and essentially no light reflected from the reflection surface 40a travels toward where the area 61 does not exist. Accordingly, the light reflected from the reflection surface 40a is substantially distributed only at angles within the yz plane from the reflection surface 40a toward the area 61. Thus, the reflection surface 40a modulates the intensity of incident light in the yz plane in an angular direction and outputs said light. The reflection surface 40a is a curved surface; therefore, the reflection surface 40a is still capable of producing light that forms lines that create the image even when the light incident thereon is parallel light.

The reflection surface 40b reflects the light incident thereon spreading the light within an area 62 in the three-dimensional image 6. The area 62 forms a portion of the character 'A' between an intersection point with the area 61 on the negative y axis and the furthest end point along the positive x axis. The reflection surface 40c reflects the light incident thereon spreading the light within an area 63 in the three-dimensional image 6. The area 63 forms a portion of the character 'A' between an intersection point with the area 61 on the positive y axis and the furthest end point along the positive x axis. The reflection surface 40d reflects the light incident thereon spreading the light within an area 64 in the three-dimensional image 6. The area 64 forms a portion of the character 'A' between an intersection point with the area 61 on the negative y axis and the furthest end point along the negative x axis. The reflection surface 40e reflects the light incident thereon spreading the light within an area 65 in the three-dimensional image 6. The area 65 forms a portion of the character 'A' between an intersection point with the area 61 on the positive y axis and the furthest end point along the negative x axis. Because the reflection surface 40b, the reflection surface 40c, the reflection surface 40d, and the reflection surface 40e are all curved, each of the reflection surfaces 40 is capable of producing light that forms lines that create the image even when the light incident thereon is parallel light.

Thus, the reflection surface 40a spreads light incident thereon having an intensity distribution according to at least the image of the area 61 along the z axis, and causes emission of said light. The reflection surface 40b spreads light incident thereon having an intensity distribution according to at least the image of the area 62 along the x axis, and causes emission of said light. The reflection surface 40c spreads light incident thereon having an intensity distribution according to at least the image of the area 63 along the x axis, and causes emission of said light. The reflection surface 40d spreads light incident thereon having an intensity distribution according to at least the image of the area 64 along the x axis, and causes emission of said light. The reflection surface 40e spreads light incident thereon having an intensity distribution according to at least the image of the area 64 along the x axis, and causes emission of said light. Thus, the optical deflector 30a possesses a plurality of reflection surfaces that reflect light towards lines in the three-dimensional image 6 where the optical deflector 30a modulates the intensity of incident light two dimensionally or in two directions according to the three-dimensional image 6, and causes emission of said light from the emission surface 71. Hereby, a single optical deflector 30a provides light beams that pass through substantially the entire three-dimensional image 6.

The optical deflector 30b includes a reflection surface 41b. Similar to the reflection surface 40a, the reflection surface 41b causes light incident thereon to be emitted from the emission surface 71 at a different emission angle according to where the light is incident on the reflection surface 41a. More specifically, the light reflecting from the reflection surface 41b spreads within an area 61 in the three-dimensional image 6. FIG. 3 only illustrates the reflection surface 40a and the reflection surface 41b; however, each of these optical deflectors 30 includes a reflection surface that spread the incident light within the area 61. Each of the optical deflectors 30 includes a plurality of reflection surfaces that reflect light toward lines within the three-dimensional image 6 similarly to the optical deflector 30a. Each of the optical deflectors 30 modulates the intensity of the light incident thereon two-dimensionally or in two directions, and causes emission of said light from the emission surface 71. Thus, each of the optical deflectors 30 provides light beams that pass through substantially the entire three-dimensional image 6.

The light emitted from the emission surface 71 is actually refracted within the emission surface 71. Therefore, the optical deflector 30 is designed to take into account the refraction within the emission surface 71. However, for the sake of simplicity, the description of one or more embodiments of the present invention is made as if there were no refraction in the emission surface 71.

Figure 4:
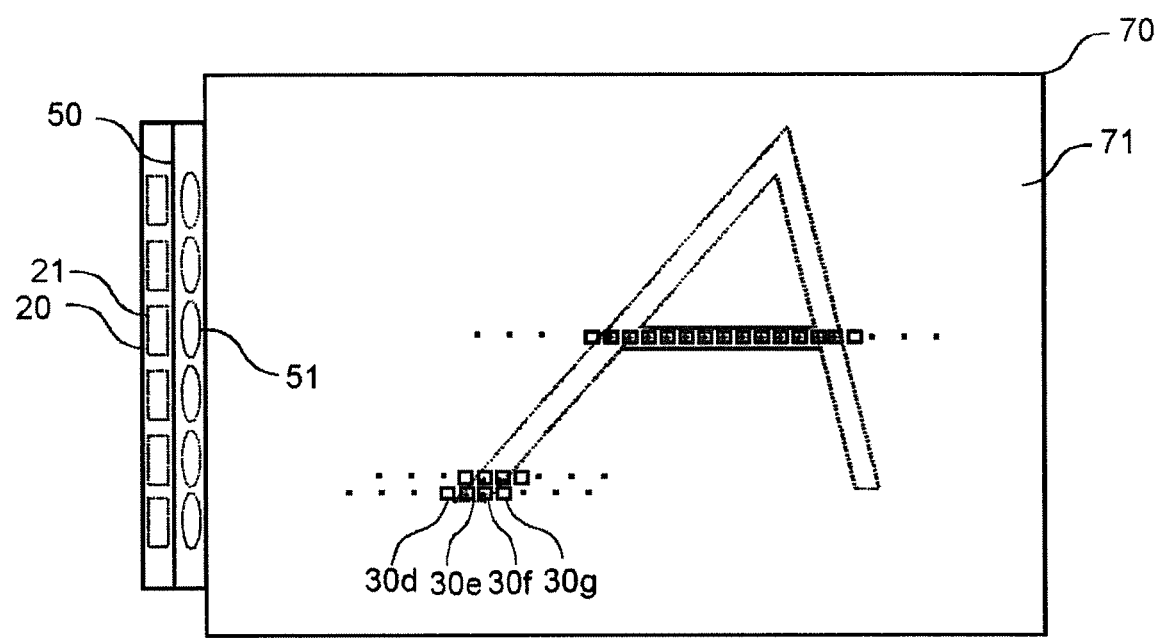
FIG. 4 schematically illustrates the optical deflector 30 providing light that travels toward a specific observation point'
Figure 4:
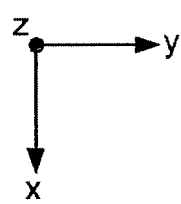

FIG. 4 schematically illustrates the optical deflector 30 providing light that travels toward a specific observation point. For instance the light forming the area 62 is provided from a specific reflection surface in the optical deflector 30e, and a specific reflection surface in the optical deflector 30f, while no light is provided from the optical deflector 30d and the optical deflector 30g. Thus, a specific portion in the three-dimensional image 6 is created by specific portions of a specific optical deflector 30 of the plurality of optical deflectors 30 when the three-dimensional image is viewed from a specific observation position.

The display device 10 is configured such that each of the optical deflectors 30 established two-dimensionally in the xy plane provide light that passes though all portions/sites in the three-dimensional image 6. Therefore, the three-dimensional image may be viewed from a wide range. Because the display device is also capable of presenting light from a specific location in the xy plane that passes through sites throughout the three-dimensional image 6, the three-dimensional image is formed as a plane and not a point.

Figure 5:
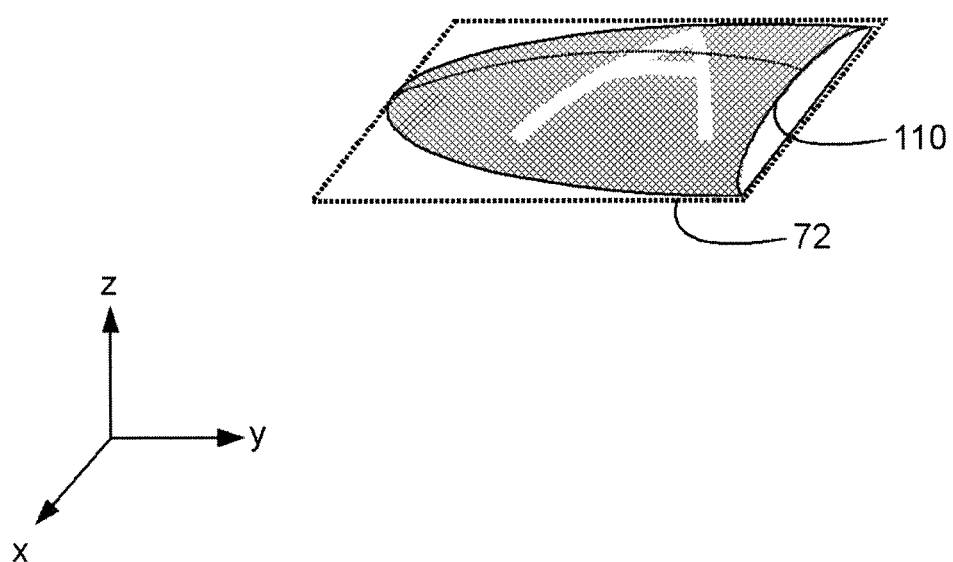
FIG. 5 is a perspective view that schematically illustrates an optical deflector 30A as a modified example of the optical deflector 30.

FIG. 5 is a perspective view that schematically illustrates an optical deflector 30A as a modified example of the optical deflector 30. The optical deflector 30A possesses an entirely convex reflection surface. The optical deflector 30A is provided on the rear surface 72 of the light guide plate 70. The convex reflection surface of the optical deflector 30A deflects the light guided through the light guide plate 70 so that the light beams passing through the plane 200 which includes the three-dimensional image exit from the emission surface 71.

The portions of the optical deflector 30A that do not correspond to creating the character 'A' are provided with an anti-reflective film 110. The light entering at portions where the anti-reflective film 110 is formed on the optical deflector 30A does not substantially reflect. The light entering at portions with no anti-reflective film 110 formed on the optical deflector 30A are reflected. Thus, the optical deflector 30A deflects light entering therein so that the light beams passing through the character 'A' of the three-dimensional image 6 exit from the emission surface 71. The anti-reflective film 110 may be produced, for instance, by coating areas of the rear surface 72 that do not correspond to the area forming the character 'A' with black paint material. The anti-reflective film 110 may be produced by printing areas that do not correspond to the area forming the character 'A' with black paint material. Because the optical deflectors 30A may be created by printing the black paint material after forming the convex portion on the light guide plate 70, this simplifies the process of producing the optical deflector.

Figure 6A:
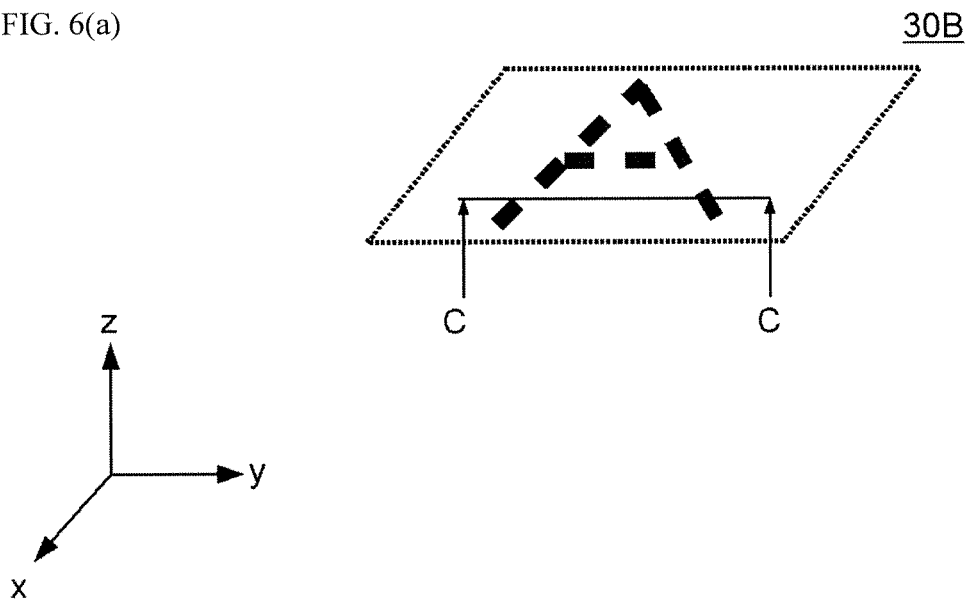
FIGS. 6A and 6B schematically illustrate an optical deflector 30B as an example for modifying the optical deflector 30.
Figure 6B:
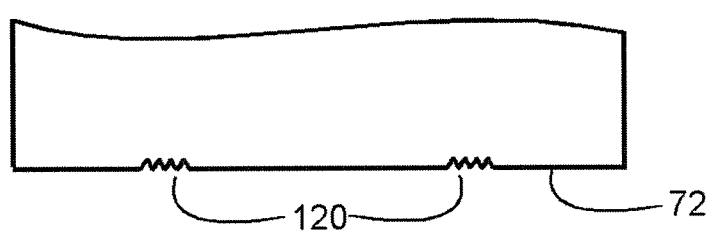
Figure 6B:
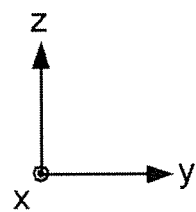

FIGS. 6A and 6B schematically illustrate an optical deflector 30B as an example for modifying the optical deflector 30. FIG. 6A is a perspective view of the optical deflector 30B, and FIG. 6B is a view of a portion C-C along a cross section in the yz plane. The optical deflector 30B possesses a plurality of reflection surfaces 120 created in a local region that corresponds to the character 'A'. Note that no reflection surfaces are formed in areas outside the local region corresponding to the character 'A'. The light entering at portions where no reflection surfaces 120 are formed on the optical deflector 30B does not substantially reflect. Whereas, the optical deflector 30B deflects light entering the portions where the reflection surfaces 120 are formed so that the light beams passing through three-dimensional image 6 exit from the emission surface 71.

Figure 7:
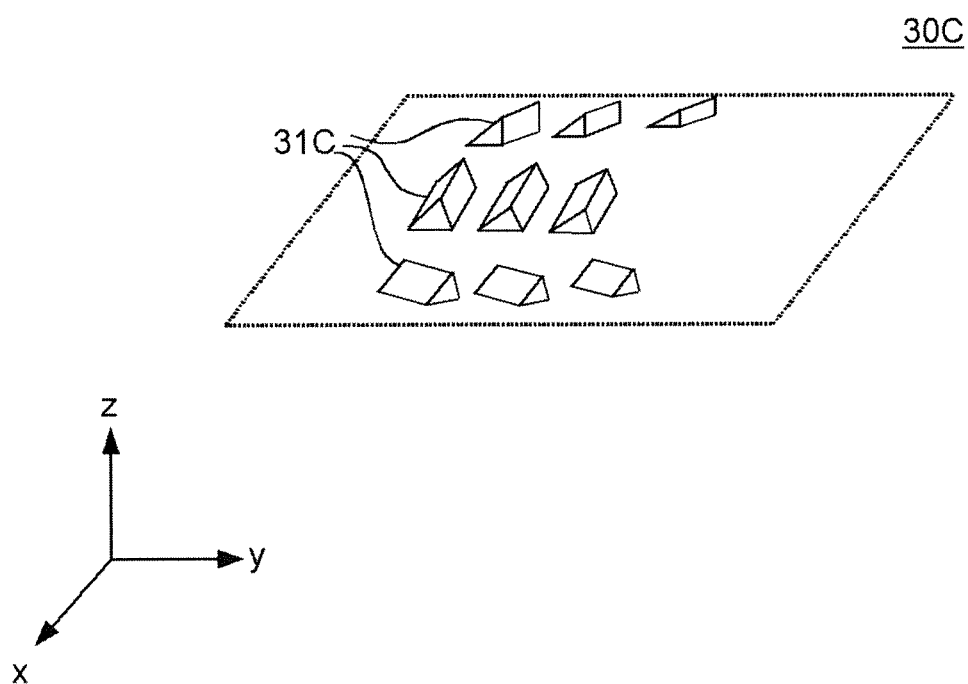
FIG. 7 schematically illustrates an optical deflector 30C as an example for modifying the optical deflector 30.

FIG. 7 schematically illustrates an optical deflector 30C as an example for modifying the optical deflector 30. The optical deflector 30C includes a plurality of optical elements 31C provided different locations. The optical elements 31C each possess a single flat reflection surface. The reflection surface included in each of the optical elements 31C reflect light incident thereon to mutually different points in the three-dimensional image 6.

The optical elements 31 may all be provided separately, or may be provided where a portion thereof are connected. The distribution pattern for the optical elements 31 may be different in accordance with the location at which optical deflectors 30 are provided.

Figure 8A:
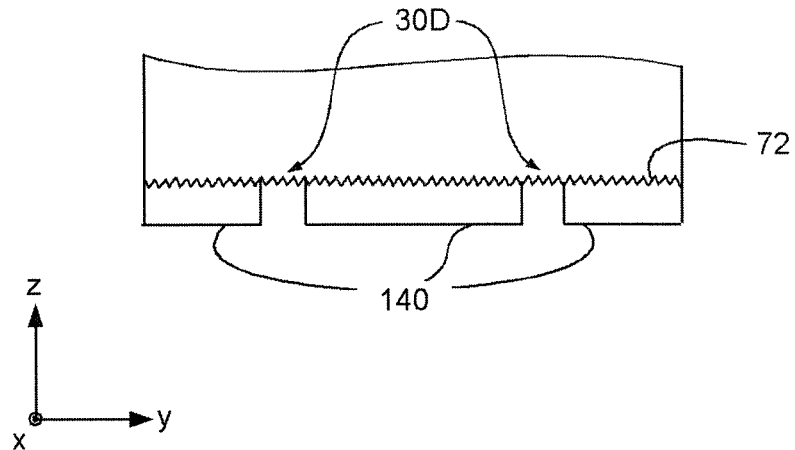
FIGS. 8A, 8B, and 8C schematically illustrate an optical deflector 30D as an example for modifying the optical deflector 30.

FIG. 8A schematically illustrates optical deflectors 30D as an example for modifying the optical deflector 30; the plurality of reflection surfaces may be formed evenly as a whole on the rear surface 72 of the light guide plate 70.

The rear surface 72 is also provided with an optical component 140. The optical component 140 is produced from material having substantially the same refractive index as a light guide plate 70. The optical component 140 possesses an optical surface facing the rear surface 72 that connects with the reflection surfaces formed on the rear surface 72. The optical component 140 is formed at regions on the rear surface 72 outside of regions that do not correspond to the character 'A' in the three-dimensional image 6, and is not provided at regions corresponding to the character 'A' in the three-dimensional image 6. The reflection surfaces formed on the rear surface 72 in the sections where no optical component 140 is provided serve as the optical deflector 30D.

The light incident at the regions of the rear surface 72 connected to the optical component 140 pass through the rear surface 72. That is, the light incident at regions at the regions of the rear surface 72 connected to the optical component 140 is not deflected in a direction allowing the light to exit from the emission surface 71. Whereas, the light incident at regions on the rear surface 72 not connected to the optical component 140 are deflected and exit from the emission surface 71, becoming light beams that pass through locations in the three-dimensional image 6.

Figure 8B:
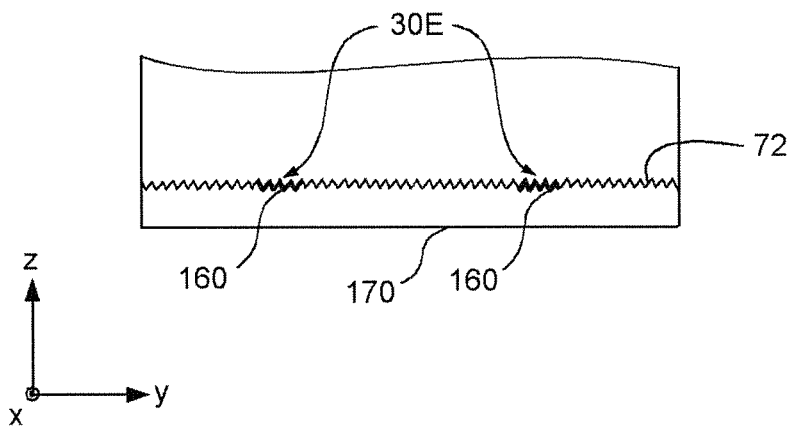

FIG. 8B schematically illustrates optical deflectors 30E as an example for modifying the optical deflector 30; the plurality of reflection surfaces may be formed as a whole on the rear surface 72 of the light guide plate 70.

The rear surface 72 is also provided with an optical component 170. The optical component 170 is produced from material having substantially the same refractive index as a light guide plate 70. The optical component 170 possesses an optical surface facing the rear surface 72 that connects with the reflection surfaces formed on the rear surface 72. A reflective film 160 is provided in regions of the optical component 170 corresponding to the character 'A' in the three-dimensional image 6. No reflective film is provided at regions outside regions corresponding to the character 'A'. The reflection surfaces formed on the rear surface 72 outside the sections connecting to the reflective film 160 of the optical component 170 serve as the optical deflector 30E.

The light incident at the regions of the rear surface 72 connected to the reflective film 160 pass through the rear surface 72. That is, the light incident at the regions of the rear surface 72 unconnected to the reflective film 160 is not deflected in a direction allowing the light to exit from emission surface 71. Whereas, the light incident at regions on the rear surface 72 connected to the reflective film 160 are deflected and exit from the emission surface 71, becoming light beams that pass through locations in the three-dimensional image 6. The reflective film 160 may be vapor-deposited silver film, vapor-deposited aluminum film, silver plated film, chrome plated film, or the like. The reflectance of the reflective film 160 in each of the optical deflectors 30E may be mutually different in accordance with the location of the corresponding image. Hereby it is possible to produce an image with varied luminance. The reflective film 160 may also selectively reflect a specific color. Hereby it is possible to produce a color image. The color of light selectively reflected by the reflective film 160 in each of the optical deflectors 30E may be mutually different in accordance with the location of the corresponding image. Hereby it is possible to produce a multi-colored image. Note that the light guide plate 70 and the optical component 170 may be considered a single light guide plate. In this case, the plurality of optical deflectors 30 is provided inside the light guide plate 70.

Figure 8C:
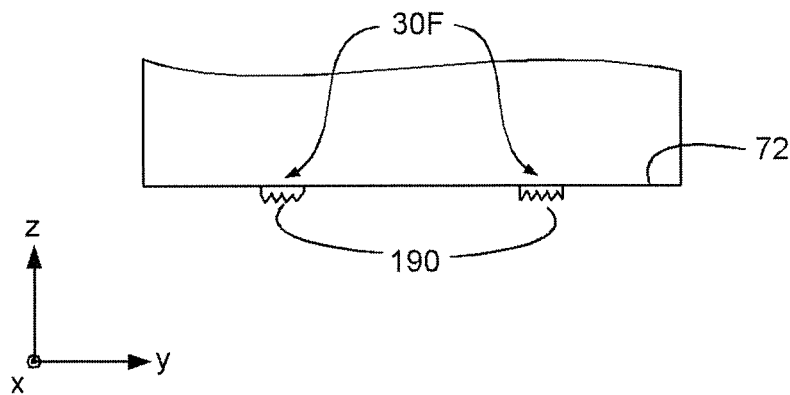
Figure 9:
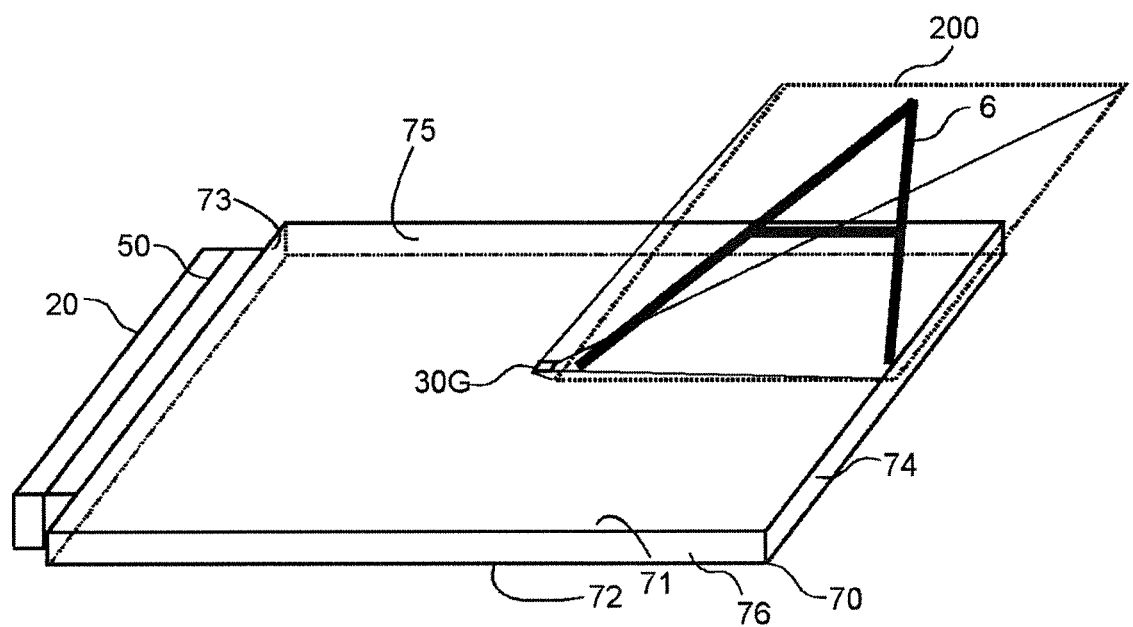
FIG. 9 is for describing a technique for producing the optical deflector 30G as an example of modifying the optical deflector 30A.

FIG. 8C schematically illustrates optical deflectors 30F as an example for modifying the optical deflector 30. An optical component 190 is provided on regions of the rear surface 72 of the light guide plate 70 corresponding to the character 'A' in the three-dimensional image 6. The optical component 190 includes a plurality of reflection surfaces on the other side from the surface thereof connected to the rear surface 72. The light incident on the optical component 190 are deflected by the plurality of reflection surfaces and exit from the emission surface 71, becoming light beams that pass through locations in the three-dimensional image 6.

FIG. 9, FIG. 10A, FIG. 10B, and FIG. 10C are for describing a technique for producing the optical deflector 30G as an example of modifying the optical deflector 30A; a portion of a Fresnel lens serves as the optical deflector 30G.

Figure 10A:
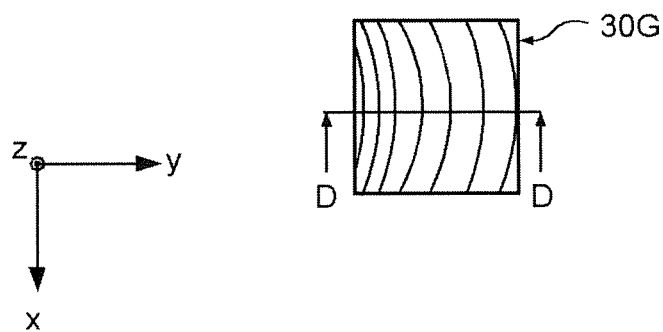
FIGS. 10A, 10B, and 10C are for describing a technique for producing the optical deflector 30G as an example of modifying the optical deflector 30A.
Figure 10B:
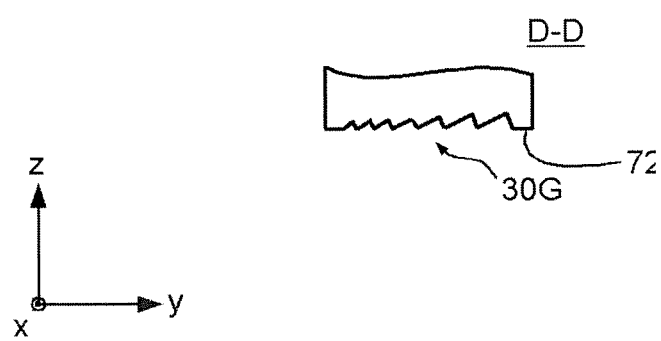

The optical surfaces forming the Fresnel lens are provided on the rear surface 72 of the light guide plate 70 for each optical deflector 30. FIG. 10A and FIG. 10B illustrates when a Fresnel lens is created for a single optical deflector 30G. The Fresnel lens in each of the optical deflectors 30 deflects light guided through the light guide plate 70 so that the light beams passing through the plane 200 which contain the three-dimensional image exit from the emission surface 71.

Figure 10C:
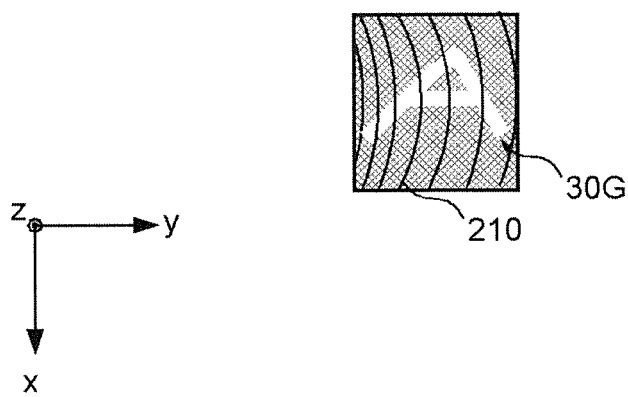

Next, as illustrated in FIG. 10C, an anti-reflective film 210 is created on the rear surface 72 of the light guide plate 70 in regions outside the regions corresponding to the character 'A' in the three-dimensional image 6. For example, the anti-reflective film 210 may be produced by printing black paint material in regions outside the regions corresponding to the character 'A' in the three-dimensional image 6. Hereby, only the light incident in some regions of the Fresnel lens corresponding to the character 'A' are substantially deflected to create light beams that pass through locations in the three-dimensional image 6 and exit from the emission surface 71. Because the optical deflectors 30 may be created by printing the black paint material after forming the optical surfaces of the Fresnel lens on the light guide plate 70, this simplifies the process of producing the optical deflector.

Figure 11:
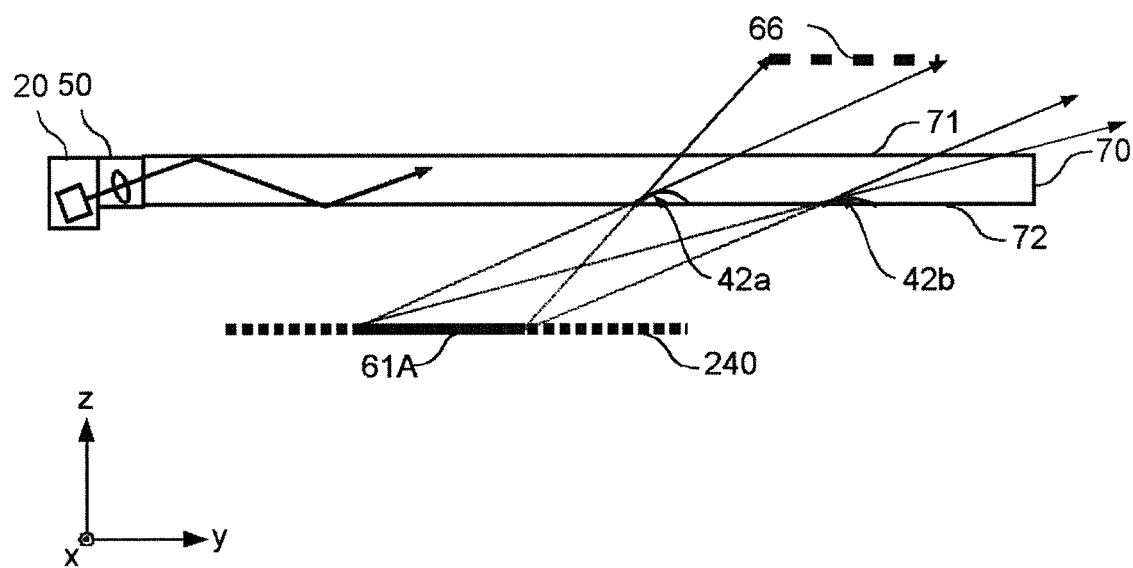
FIG. 11 schematically illustrates a display device 10A as an example of modifying the display device 10.

FIG. 11 schematically illustrates a display device 10A as an example of modifying the display device 10. The display device 10A projects a virtual three-dimensional image in a space opposite the emission surface 71. This example supposes that the three-dimensional image is located in a plane 240 parallel to the emission surface 71.

FIG. 11 illustrates a first reflection surface 42k and a second reflection surface 42b belonging to mutually different optical deflectors 30. The area 61A in FIG. 11 is one of the lines forming the three-dimensional image. For instance, the area 61A may correspond to the area 61 into three-dimensional image 6.

The reflection surface 42a deflects the light incident thereon at a different angle in accordance with the location of incidence, and the light exits from the emission surface 71. More specifically, the reflection surface 42a orients light toward an area 66 symmetrical to the area 61A relative to the reflection surface 42a and causes the light to then exit from the emission surface 71. For instance, the reflection surface 42a reflects the light incident thereon in the direction of a line connecting an end point in the negative y axis direction of the area 62 and the point at which the light is incident. Additionally, the reflection surface 42a reflects the light incident thereon in the direction of a line connecting an end point in the positive y axis direction of the area 62 and the point at which the light is incident. Thus, the reflection surface 42a supplies light beams connecting any desired point in the area 61A and the reflection surface 42a. The reflection surface 42a hereby provides light beams identical to the light beams emanating from the area 61A. The reflection surface 42a similarly provides light beams connecting any desired point in the area 61A and the reflection surface 42a. Thus, the reflection surface for the optical deflector merely needs to be formed to reflect emission light toward a location where the image is symmetrical to the optical deflector to create an image in the space opposite the emission surface 71. Additionally, when creating a three-dimensional image in the space near the rear surface 72, light from three or more optical deflector which output light with an intensity distribution in accordance with the three-dimensional image near the rear surface 72 may be used to create light that spreads from the three-dimensional image near the rear surface 72 similarly to creating the three-dimensional image 6 in the space near the emission surface 71. Thus, the display device 10A gathers light beams from the two-dimensionally arranged plurality of optical deflectors to supply light beams that radiate from the three-dimensional image near the rear surface 72 in a space near an observer.

The above provides a description of the cases where the display device 10 and the display device 10A present an image that is formed within a plane parallel to the emission surface 71. However, the location of the three-dimensional image is not limited to a within a plane parallel to the emission surface 71.

Again, the optical deflectors 30 may be provided as a matrix in the xy plane as above described. For instance, the optical deflectors 30 may be provided at equal pitch in the x axis direction and at equal pitch in the y axis direction. The pitch of the optical deflectors 30 in the x axis direction may be the same or different from the pitch in the y axis direction. The pitch of the optical deflectors 30 may be smaller in the x axis direction than in the y axis direction. The density of the points in the x axis direction in the three-dimensional image 6 increases when the pitch of the optical deflectors 30 is smaller in the x axis direction than in the y axis direction. Therefore, the plurality of points forming the three-dimensional image 6 are connected along the x-axis direction allowing those points to be more easily perceived as a line. Hereby, an observer can easily recognize both ends of the line and more easily perceive the form of the three-dimensional image 6.

The pitch of the optical deflectors 30 may be varied within the xy plane. Varying the pitch of the optical deflectors 30 in the xy plane makes it possible to modify the resolution of the three-dimensional image 6 in each region. Additionally, the optical deflectors 30 need not be provided regularly. The optical deflectors 30 may be provided randomly within the xy plane. In order for an observer to perceive the display device 10 is transparent, the pattern density of the optical elements 31 according to one or more embodiments of the present invention is 50% or less. Additionally, the pattern density of the optical elements 31 according to one or more embodiments of the present invention is 10% or less.

Figure 12A:
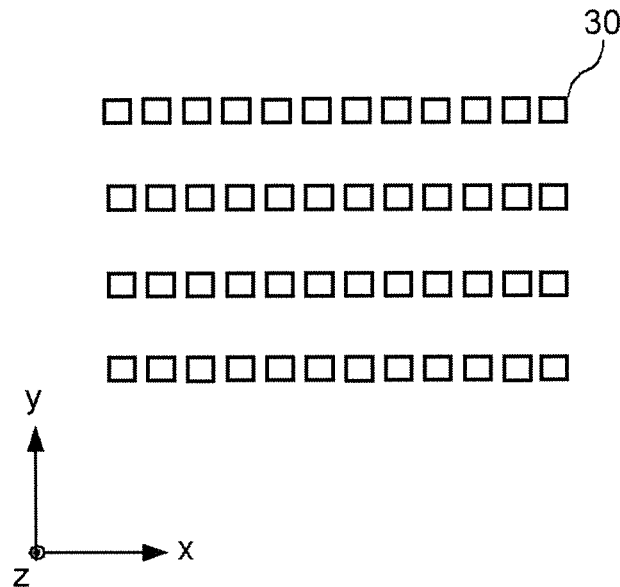
FIGS. 12A and 12B schematically illustrate various examples for distributing the optical deflectors 30.

FIG. 12A schematically illustrates an example of distributing the optical deflectors 30 in strips. While in this example the optical deflectors 30 form lines in the x axis direction and in the y axis direction, the optical deflectors 30 have a smaller pitch in the x-axis direction than the pitch of the optical deflectors 30 in the y-axis direction.

Figure 12B:
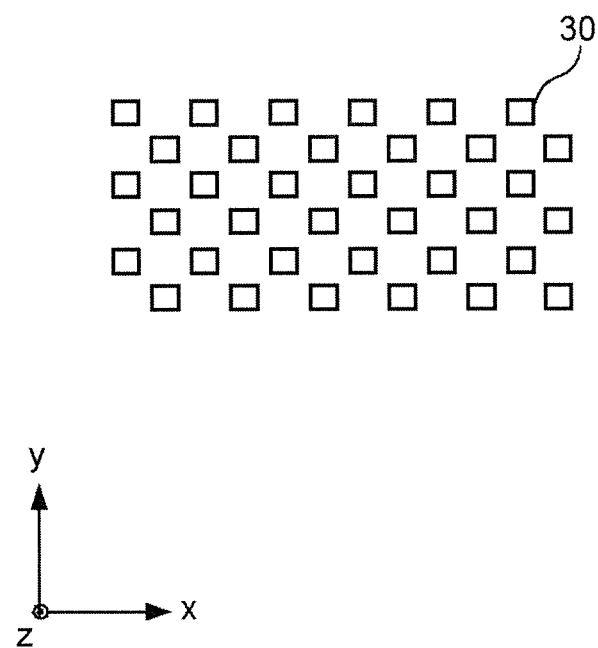

FIG. 12B schematically illustrates an example of distributing the optical deflectors 30 in a zigzag pattern. For example, taking the x-axis direction as a row, the pinch of the optical detectors 30 in each row is identical. The positions of the optical deflectors 30 adjacent in the y-axis direction between rows are shifted in the x-axis direction. For example, the optical deflectors 30 between adjacent rows may be shifted in the x-axis direction by half the pitch between the optical deflectors 30 along a row.

Figure 13A:
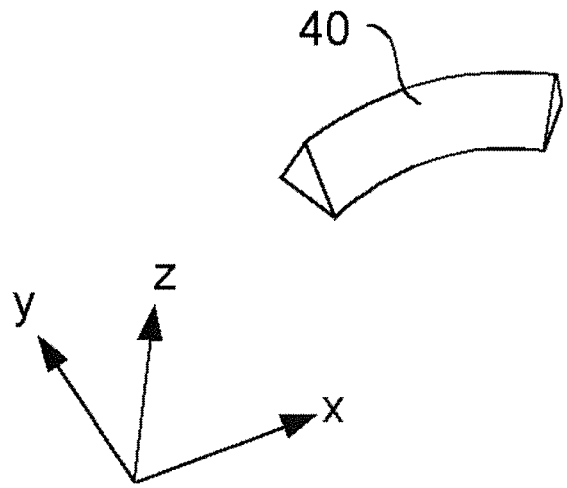
FIGS. 13A and 13B schematically illustrate various examples for the shape of the optical element 31.
Figure 13B:
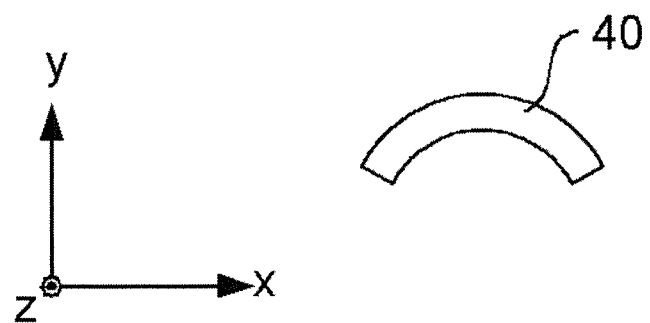

FIGS. 13A and 13B schematically illustrate various examples for the shape of the optical element 31; FIG. 13A is a perspective view of an optical element 31, and FIG. 13B illustrates when the reflection surface 40 is projected onto the xy plane. When the reflection surface 40 is projected onto the xy plane, the outer shape in positive y axis direction and the outer shape toward the negative y axis direction which outline the reflection surface 40 are concentric arcs. The outer shape in the negative y axis direction of the reflection surface 40 projected onto the xy plane may be referred to as the front outline while the outer shape toward the positive y axis direction is referred to as the rear outline. The front outline and the rear outline of the reflection surface 40 form concentric arcs.

If cut along a plane parallel to the zy plane, the line of intersection between the optical element 31 illustrated in FIG. 13A and FIG. 13B and the reflection surface 40 is a straight line. However, because the front outline and the rear outline are curved, the reflection surface 40 in FIGS. 13A and 13B is a curved surface. Therefore, a single reflection surface 40 can present the light needed to create a line or a plane forming at least a portion of the image.

Figure 14A:
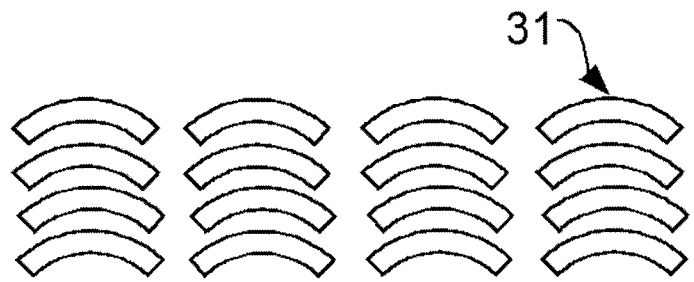
FIGS. 14A, 14B, and 14C schematically illustrate various examples for distributing the optical elements 31 in the xy plane.
Figure 14B:
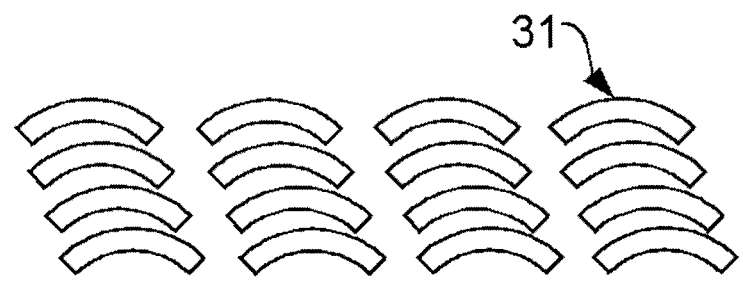
Figure 14C:
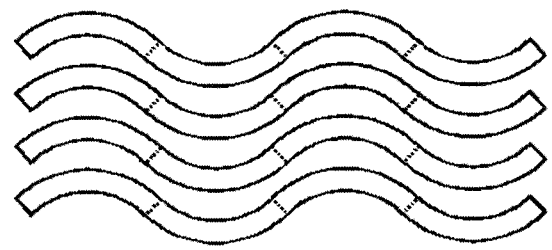

FIGS. 14A, 14B, and 14C schematically illustrate various examples for distributing the optical elements 31 in the xy plane. FIG. 14A illustrates an example where a plurality of optical elements 31 forms a line along the y axis direction. FIG. 14B is a modified version of the example in FIG. 14A, and illustrates an example where the optical elements 31 are distributed so that when the optical elements 31 lined up in the y axis direction are viewed in order, the same shifted along the x axis direction by a fixed offset. FIG. 14C illustrates an example where the optical elements 31 are distributed continuously as a single element along the x axis direction. In FIG. 14C the end portions of optical elements adjacent in the x axis direction are connected to provide a single optical element. The dashes in FIG. 14C correspond to the end ports of adjacent optical elements in the x axis direction.

Figure 15A:
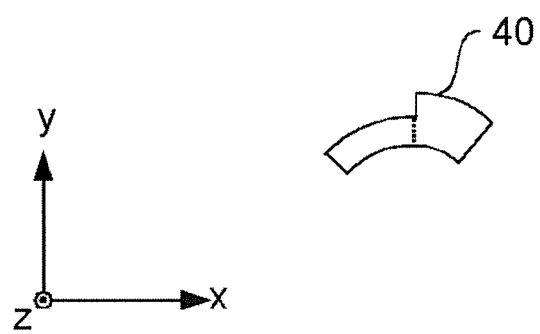
FIGS. 15A and 15B schematically illustrate other example shapes for the reflection surface of the optical element 31.
Figure 15B:
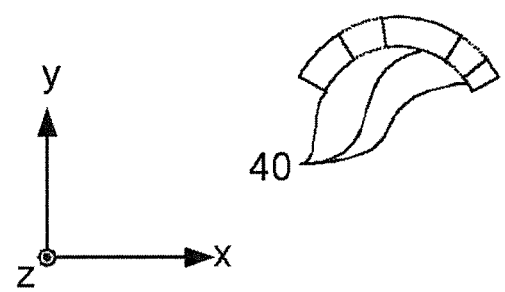

FIGS. 15A and 15B schematically illustrate other example shapes for the reflection surface of the optical element 31; FIG. 15A and FIG. 15B depicts the shape of the reflection surface 40 projected onto the xy plane. The reflection surface 40 illustrated in FIG. 15A has a shape that includes reflection portions connected along the x axis direction. In one reflection portion the front outline and the rear outline are concentric arcs with a first curvature, and in another reflection portion the front outline and the rear outline are concentric arcs with a second curvature. As can be seen in FIG. 15B the front outline and a rear outline forming the concentric arcs outlining the reflection surface 40 are partitioned to provide a reflection surface 40 separated into a plurality of sections. The reflection surface whose front outline and rear outline are concentric arcs is partitioned whereby the reflection surface 40 depicted in FIG. 15B is separated into a plurality of sections.

Figure 16A:
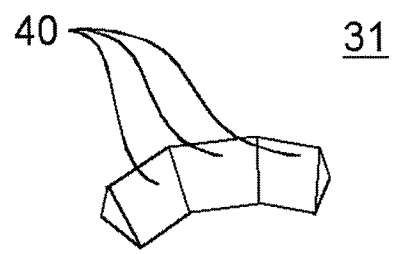
FIGS. 16A and 16B schematically illustrate other example shapes for the reflection surface of the optical element 31.
Figure 16A:
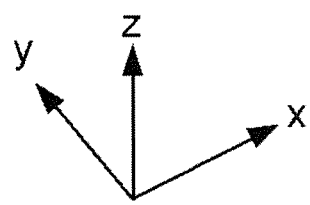
Figure 16B:
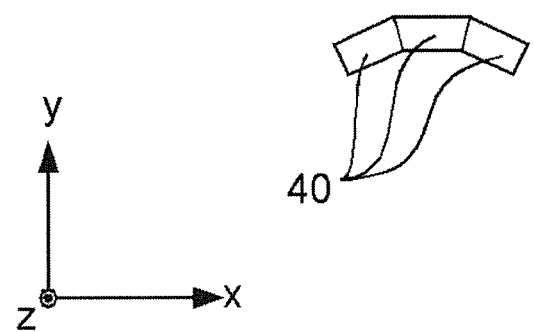

FIGS. 16A and 16B schematically illustrate other example shapes for the reflection surface of the optical element 31. FIG. 16A is a perspective view of an optical element 31, and FIG. 16B illustrates when the reflection surface 40 of the optical element 31 is projected onto the xy plane. The optical element 31 is created from three planes with mutually different normal line directions. When the reflection surface 40 is projected onto the xy plane, each of the front outlines and the rear outlines form three polygonal lines that extend in different directions. Because the reflection surface 40 illustrated in FIGS. 16A and 16B is flat, light entering each of the reflection surfaces 40 are oriented in three mutually different directions. Therefore, the optical element 31 illustrated in FIGS. 16A and 16B can present light that creates three points which are a portion of the image.

Figure 17A:
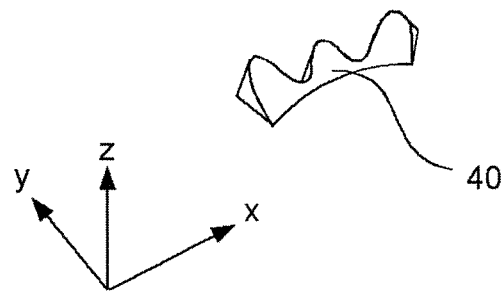
FIGS. 17A, 17B, and 17C schematically illustrate other example shapes for the reflection surface of the optical element 31.
Figure 17B:
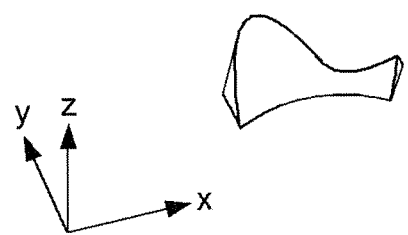
Figure 17C:
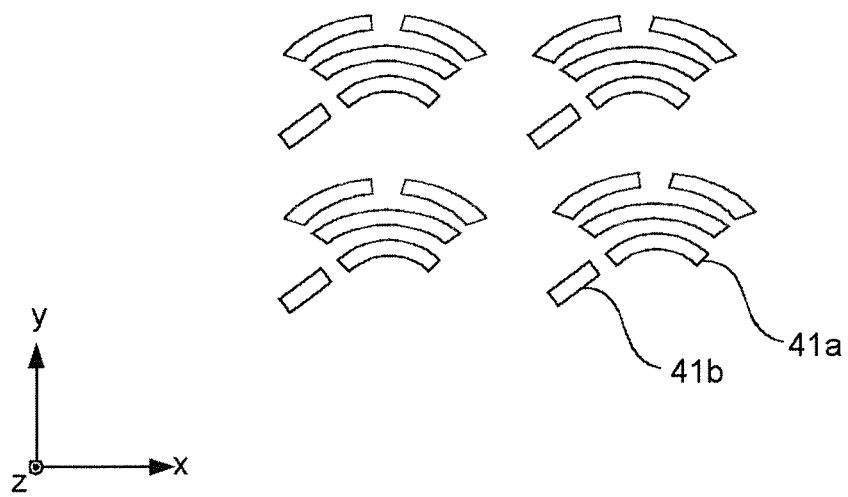

FIGS. 17A, 17B, and 17C schematically illustrate other example shapes for the reflection surface of the optical element 31. The reflection surfaces 40 in the optical element 31 illustrated in FIG. 17A and FIG. 17B differ from the optical element 31 illustrated in FIG. 13A; that is, the ridge of the reflection surface 40 toward the positive z axis has different heights in the z-axis direction. When projected onto the xz plane, the ridge of the reflection surface 40 toward the positive z axis changes continually along the x axis direction When cut along a plane parallel to the yz plane the linear length of the reflection surface 40 changes along the x axis direction. The intensity of light reflected from the reflection surface 40 therefore changes along the x axis direction. Consequently, the optical element 31 illustrated in FIG. 17A and FIG. 17B can present light for creating an image of lines where the luminance thereof changes along the x direction.

FIG. 17C schematically illustrates various examples for distributing the optical elements 31 in the xy plane. Each of the optical elements 31 includes a plurality of optical elements that are curved reflection surfaces where the front outline in the rear outline form concentric arcs (e.g., reflection surface 41a), and optical elements that are flat reflection surfaces (e.g., reflection surface 41b). The optical elements that are flat reflection surfaces can provide reflection light of higher intensity per surface area than the optical elements with curved reflection surfaces. Thus, distributing the kind of optical elements illustrated in FIG. 17C can increase the intensity of light output from the flat reflection surface in a particular direction. Hereby it is possible to provide light that creates an image having a point with a relatively high luminance. The optical elements 31 illustrated in FIG. 17A, FIG. 17B, and FIG. 17C spread light incident thereon with an intensity distribution that changes continuously or gradually in the angular direction, and causes said light to exit from the emission surface 71.

Figure 18A:
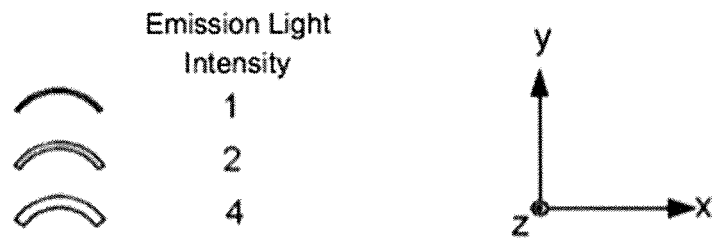
FIGS. 18A, 18B, and 18C are for describing the difference in emission light intensity due to the surface area of the reflection surface 40.
Figure 18B:
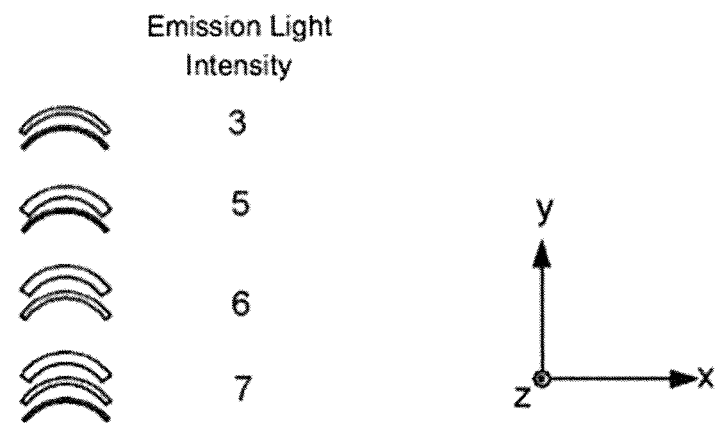
Figure 18C:
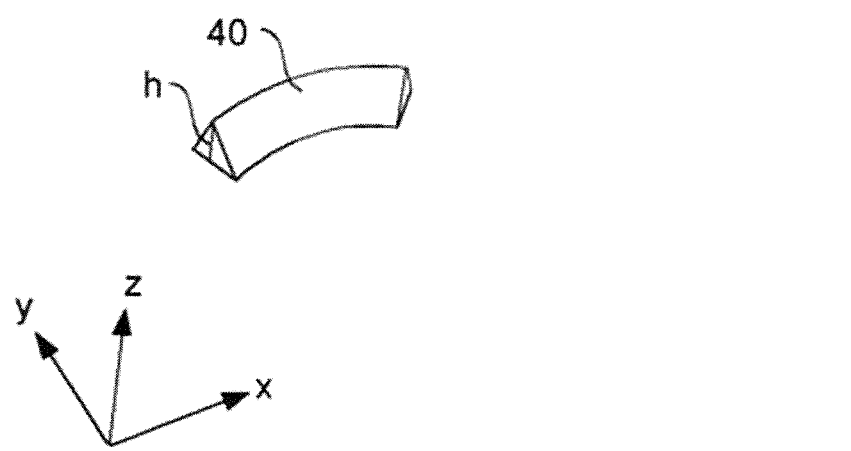

FIGS. 18A, 18B, and 18C are for describing the difference in emission light intensity due to the surface area of the reflection surface 40. FIG. 18A illustrates when the reflection surface 40 is projected onto the xy plane. The three reflection surfaces illustrated in FIG. 18A have outer shapes with mutually different curvatures, and mutually different lengths in the y axis direction. The length in the y axis direction is proportional to the length of a straight line intersecting a plane parallel to the yz plane and the reflection surface 40. The amount of emission light increases as the length of the straight line intersecting a plane parallel to the yz plane and the reflection surface 40 increases. As illustrated in FIG. 18A, taking the amount of emission light of a reference reflection surface as 1, a reflection surface with an intersecting line double the length of the reference reflection surface, obtains double the amount of emission light, and the location on the image corresponding thereto also has double the luminance. Additionally, a reflection surface with an intersecting line quadruple the length of the reference reflection surface, obtains four times the amount of emission light, and the location on the image corresponding thereto also has four times the luminance. Thus, the luminance of an image may be modified for each region in the image via optical elements having reflection surfaces with intersecting lines of different lengths. More generally, at least n-levels of presentation is possible by way of a plurality of optical elements with n types of intersecting line lengths. Further, 2n-levels of presentation is possible by combining a plurality of optical elements where the intersecting lines are the power of any desired cardinal number (e.g., 2) with n types of intersecting line lengths, where. Here, n is any positive value greater than or equal to 2. The reflection surfaces 40 with different surface areas as illustrated in FIGS. 18A, 18B, and 18C may be used to spread light incident thereon with an intensity distribution that changes continuously or gradually in the angular direction, and cause said light to exit from the emission service 71. Note that a plurality of light guide plates capable of providing multi-tonal display may be used where light of mutually different colors (e.g., three colors: red, blue, and green) may enter the light guide plates to accomplish color display.

FIG. 18B illustrates an example of distributing the reflection surfaces to adjust the amount of emission light by combining a plurality of reflection surfaces where the length of the intersecting lines are different. For example, an amount of emission light of 3 can be obtained by combining reflection surfaces where the amount of emission light is 1 and 2 respectively. The luminance of the corresponding section in the image can thus be tripled by ensuring that the light from this combined reflection surface exits toward the same position or near the position in the image. As illustrated in FIG. 18A and FIG. 18B, the combination of three optical elements with intersecting lines of different lengths makes it possible to present eight levels of gradation.

FIG. 18C depicts the height h of a perpendicular line drawn from an edge of the reflection surface 40 in the positive the direction down to the xy plane. Varying the heights of the reflection surfaces also varies the amount of emission light.

Note that the light-incidence tuning portion 50 with lenses 51 in the display device 10 makes it possible to obtain incident light with a small spread angle. A light source capable of outputting light satisfying the above described spread angle may be used without providing the light-incidence tuning portion 50. The aforesaid light source may be a laser light source, such as a laser diode, or the like. Additionally, a single LED 21 may be used as a light source; the radiation pattern of the light from the single LED 21 may be extended out to obtain light satisfying the above described spread angle. The emission window of the LED 21 may also be narrowed to obtain light satisfying the above described spread angle. A light guide plate having an emission surface facing the first edge of the light guide plate 70 may be placed between the LEDs or the like of a single light source and the first edge 73 to have a light emitted from said light guide plate enter the first edge 73.

Figure 19:
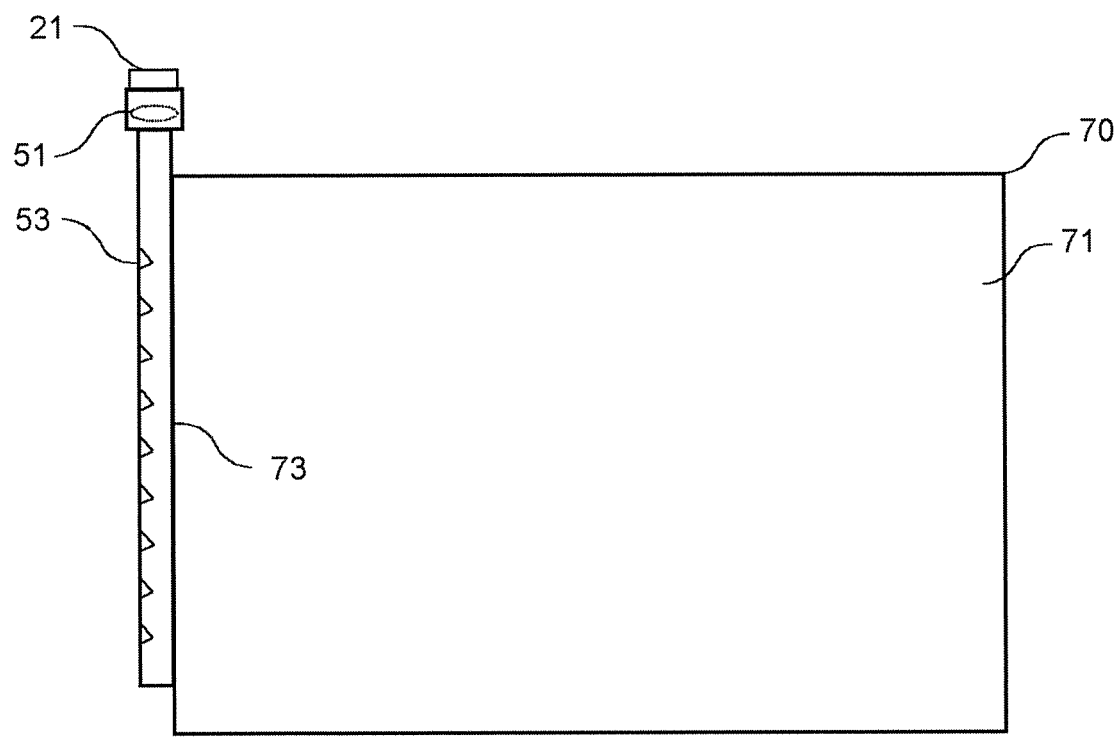
FIG. 19 schematically illustrates a light guide plate 53 and lenses 51 as an example of modifying a light-incidence tuning portion 50.
Figure 19:
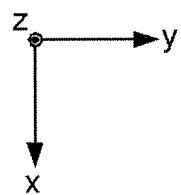

FIG. 19 schematically illustrates a light guide plate 53 and lens 51 as an example of modifying the light-incidence tuning portion 50. Light from the LED 21 is rendered substantially parallel in a direction along the x axis direction by the lens 51, and enters the light guide plate 53. Light entering the light guide plate 53 propagates in a direction along the x axis. The emission surface of the light guide plate 53 is provided facing the first edge 73. The light that travels through the light guide plate 53 is reflected by a plurality of reflection surfaces formed on a portion of the surface opposite emission surface of the light guide plate 53; the reflected light exits from the emission surface of the light guide plate 53 in the xy plane as at substantially parallel light beams. Thus, light beams parallel to the y axis direction enter the light guide plate 70 from the first edge 73. Hereby, the light guide plate 70 may propagate light with a small spread angle through the xy plane and the yz plane.

Note that the above describes a configuration that uses incident light which is substantially parallel to the y axis direction in order to have light with a small spread angle in the xy plane and the yz plane in the light guide plate 70. There other configurations for creating light with a small spread angle in the xy plane and the yz plane; for instance, a configuration using a light source 20 with substantially a single point light source, and a light-incidence tuning portion 50 that reduces the spread of the light from said light source within the yz plane. In this case, the light-incidence tuning portion 50 may be a cylindrical convex lens that protrudes in at least one of the positive y axis direction or the negative y axis direction within the yz plane.

Figure 20:
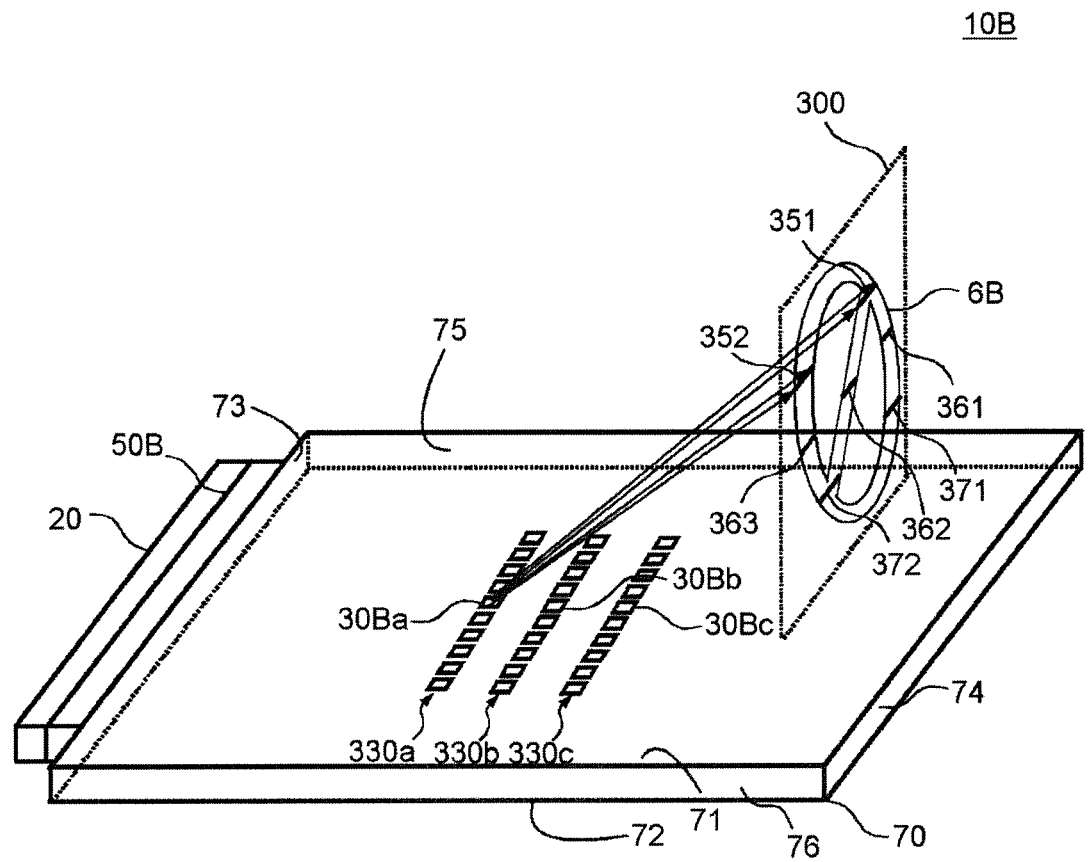
FIG. 20 schematically illustrates a display device 10B as an example of modifying the display device 10, along with a three-dimensional image 6B.
Figure 21:
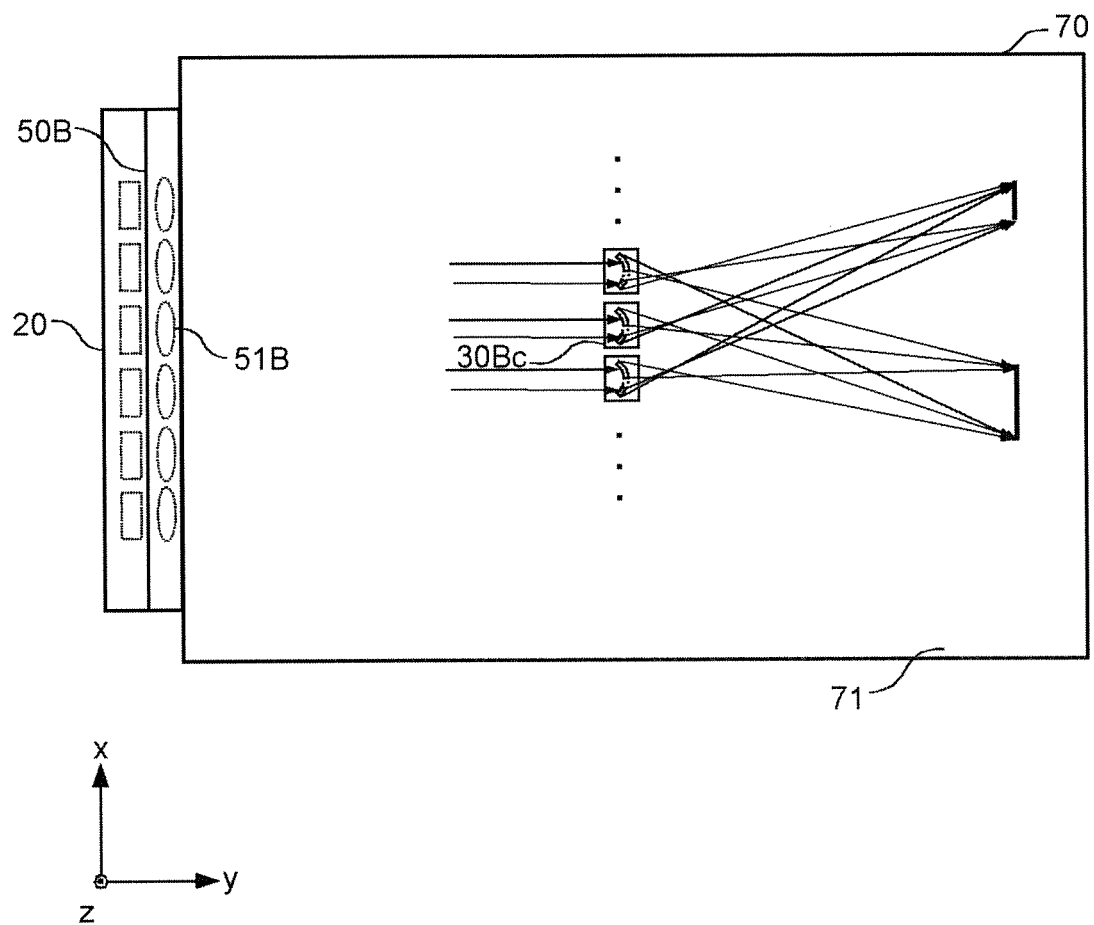
FIG. 21 is a plan view of the display device 10B in the xy plane.

FIG. 20 schematically illustrates a display device 10B as an example of modifying the display device 10, along with a three-dimensional image 6; and FIG. 21 is a plan view of the display device 10B in the xy plane. The display device 10B projects a three-dimensional image 6B onto a plane 300 parallel to the xz plane.

Compared to the display device 10, the light traveling in the light guide plate 70 in the display device 10B has a wider spread in the yz plane. As is later described, the light-incidence tuning portion 50B reduces the spread angle of light from the light source 20 within the xy plane, similarly to the light-incidence tuning portion 50. However, the light-incidence tuning portion 50B does not reduce the spread angle of the light from the light source 20 in the yz plane. The light-incidence tuning portion 50B does not substantially affect the spread angle of the light from the light source 20 in the yz plane. For example, the lens 51B in the light-incidence tuning portion 50B is a convex cylindrical lens that is curved in the xy plane and has substantially has no curve in the yz plane. The lenses 51 are cylindrical lens with curvature in both planes. The spread angle of the light entering the light guide plate 70 is greater when projected onto the yz plane than when projected onto the xy plane. The beam spread angle of light guided by the light guide plate 70 when projected onto xy plane may be 5° or less. According to one or more embodiments of the present invention, the beam spread angle of the light in the xy plane is less than 1°. Another method of reducing the beam spread angle of the light within the xy plane of the light guide plate 70 may involve adopting a single light source, e.g., an LED, as the light source 20, and adopting a mask with a window smaller than a predetermined weight in the x axis direction as the light-incidence tuning portion 50B.

The display device 10B has a plurality of optical deflector groups including an optical deflector group 330a, an optical deflector group 330b, and an optical deflector group 330c. The optical deflector groups 330 include a plurality of optical deflectors provided along a direction parallel to the x axis. For example, the optical deflector group 330a has a plurality of optical deflectors 30 including an optical deflector 30Ba. The optical deflector group 330b also has a plurality of optical deflectors including an optical deflector 30Bb. The optical deflector group 330b also has a plurality of optical deflectors including an optical deflector 30Bc.

The optical deflector 30Ba deflects the light incident thereon causing the light to spread in a direction parallel to the xy plane, and causing the light to exit from the emission surface 71. The light beams output from the emission surface 71 due to the optical deflector 30Ba intersect the plane 300 as a line for the most part. As illustrated in FIG. 20 and FIG. 21, two light beams are output from the emission surface 71 due to the optical deflector 30Ba. The two light beams output intersect the plane 300 at a line 351 and a line 352. As illustrated in FIG. 21, any of the optical deflectors included in the optical deflector group 330a cause the emission surface 71 to output light beams that intersect the plane 300 at the line 351 and the line 352, similarly to the optical deflector 30Ba. The line 351 and the line 352 exist for the most part in a plane parallel to the xy plane and form a portion of the three-dimensional image 6. Thus, the light from the numerous optical deflectors 30 belonging to the optical deflector group 330a creates an image of the line 351 and the line 352. The light producing the image of the line 351 and the line 352 may be provided by at least two optical deflectors 30 set at different locations along the x axis direction. That is, each of the optical deflectors 30 belonging to the optical deflector group 330a spreads the light incident thereon that has an intensity distribution corresponding to the line 351 and the line 352; the light is spread in the x axis direction within a plane parallel to the emission surface 71 and caused to exit from the emission surface 71. Hereby, light from the plurality of optical deflectors 30 belonging to the optical deflector group 330a arranged along the x axis direction becomes light that forms an image at the line 351 and the line 352.

The optical deflector 30Bb deflects the light incident thereon causing the light to spread in a direction parallel to the xy plane, and causing three light beams to exit from the emission surface 71. The three light beams output intersect the plane 300 at a line 361, a line 362, and a line 363. Any of the optical deflectors included in the optical deflector group 330b may cause the emission surface 71 to output light beams that intersect the plane 300 at the line 361, the line 362, and the line 363. Thus, each of the optical deflectors 30 belonging to the optical deflector group 330b spreads the light incident thereon that has an intensity distribution corresponding to the line 361, the line 362, and the line 363; the light is spread in the x axis direction within a plane parallel to the emission surface 71 and caused to exit from the emission surface 71. Hereby, light from the plurality of optical deflectors 30 belonging to the optical deflector group 330b arranged along the x axis direction becomes light that forms an image at the line 361, the line 362, and the line 363. The line 361, the line 362, and the line 363 exist for the most part in a plane parallel to the xy plane and form a portion of the three-dimensional image 6B. The line 361, the line 362, and the line 363, and the line 351 and the line 352 are at different locations along the z axis within the plane 300.

The optical deflector 30Bc deflects the light incident thereon causing the light to spread in a direction parallel to the xy plane, and causing three light beams to exit from the emission surface 71. The two of the light beams output intersect the plane 300 at a line 371 and a line 372. Any of the optical deflectors included in the optical deflector group 330c may cause the emission surface 71 to output light beams that intersect the plane 300 at the line 371 and the line 372. Each of the optical deflectors 30 belonging to the optical deflector group 330c thus spreads the light incident thereon that has an intensity distribution corresponding to the line 371 and the line 372; the light is spread in the x axis direction within a plane parallel to the emission surface 71 and caused to exit from the emission surface 71. Hereby, light from the plurality of optical deflectors 30 belonging to the optical deflector group 330c arranged along the x axis direction becomes light that forms an image at the line 371 and the line 372. The line 371 and the line 372 exist for the most part in a plane parallel to the xy plane and form a portion of the three-dimensional image 6. The line 371 and the line 362, and the line 351 and the line 352 are at different locations along the z axis within the plane 300. The line 371 and the line 372, the line 361, and the line 362 and line 363 are at different locations along the z axis within the plane 300.

Thus, the display device 10B gathers light beams from the two-dimensionally arranged plurality of optical deflectors to present light beams that radiate from the image 6B in the space near an observer. Therefore, an observer can perceive the three-dimensional image 6B from a wide range of positions along the x axis direction.

Figure 22:
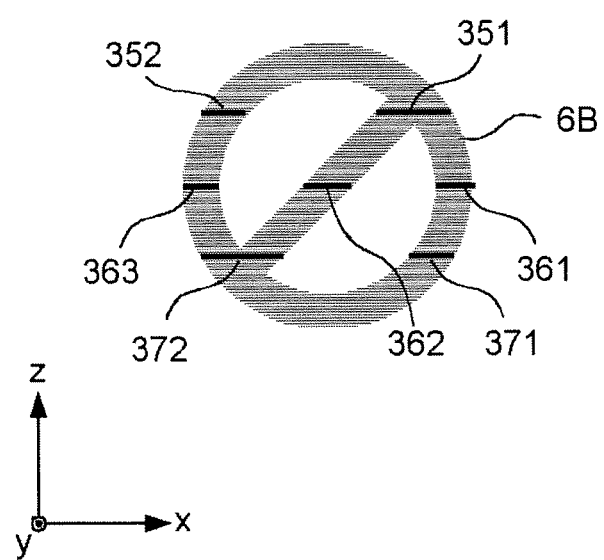
FIG. 22 schematically illustrates a three-dimensional image 6B projected by the display device 10B onto a plane 300.

FIG. 22 schematically illustrates a three-dimensional image 6B projected by the display device 10B onto a plane 300. In this manner, light from the plurality of optical deflector element groups in the display device 10B produce a plurality of lines at mutually different locations in the z axis in the plane 300 wherein the three-dimensional image 6B is created. The plurality of lines in the plane 300 due to the light beams from the plurality of optical deflector element groups create the three-dimensional image 6B.

The optical deflectors 30 may be provided regularly or irregularly in the display device 10B similarly to the display device 10. The pitch of the optical deflectors 30 may be varied in each region in the x axis direction to thereby vary the luminance in the three-dimensional image 6B. Another method of adjusting the luminance may involve varying the size of the optical surface of the optical deflectors 30 in each region. For example, the luminance in each region may be modified by varying at least one of the height or the length of the optical surface included in the optical deflector 30. The display device 10B may be afforded eight levels of luminance whereby monochrome or eight-tone single color display is possible. Note that three light guide plates capable of providing eight-tone multi-tonal display may be used where, light of mutually different colors (e.g., three colors: red, blue, and green) may enter the light guide plates to accomplish a full-color display.

The luminance of the image produced via a single optical deflector group 330 is proportional to the amount of light from the optical deflectors 30 available within a unit angle in the xz plane from the location at which the image is formed. Assuming that the amount of light output from each of the optical deflectors 30 is the same, the luminance of the image formed is proportional to the number of optical deflectors 30 available within a unit angle. Accordingly, to create an image with a uniform luminance, according to one or more embodiments of the present invention, the pitch of the optical deflectors 30 in the x axis direction increases as the distance between the location of the image corresponding to each of the optical deflectors 30 and the z axis direction increases. For example, according to one or more embodiments of the present invention, the pitch of the optical deflectors 30 belonging to the optical deflector group 330a corresponding to the line 351 and the line 352 is greater than the pitch of the optical deflectors 30 belonging to the optical deflector groups 330 corresponding to lines located closer to the light guide plate 70 than the line 351 or the line 352 (e.g., optical deflector group 330b, optical deflector group 330c, or the like), the pitch of the optical deflectors 30 belonging to the optical deflector groups 330 belonging to each of the optical deflector groups 330 may be proportional to the distance between the location of the line produced by light from each of the optical deflectors 30 and the light guide plate 70 in the z axis direction. Hereby, the number of optical deflectors 30 available within a unit angle can be the same when viewed from a location where the image is formed; therefore, this prevents large differences in light intensity of the image due to the location of the image along the z axis direction.

FIG. 23A schematically illustrates an example shape of an optical surface of the optical deflector 30Bb projected onto the xy plane. The optical deflector 30Bb includes an optical surface 380a and an optical surface 380b which provide the outer shape of an arc. The optical surface 380a and the optical surface 380b spread light incident thereon in the xy plane. The optical surface 380a and the optical surface 380b are separated. The area separating the optical surface 380a and the optical surface 380b correspond to a section of the three-dimensional image 6B with no lines.

The optical surface 380a and the optical surface 380b may be connected. The curvature of the outer shape of the optical surface 380a may differ from the curvature of the outer shape of the optical surface 380b. Additionally, the three-dimensional image 6B may have varied brightness along the x axis direction; here the length of the line intersecting the optical surfaces 380 and the yz plane may be varied in the x axis direction. For instance, the height of the optical surfaces 380 may be varied. There may also be a plurality of optical surfaces 380 producing the same line.

Figure 23:
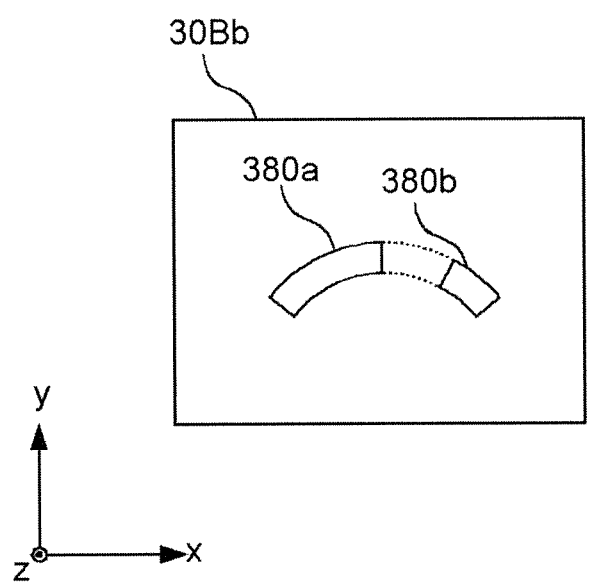
FIG. 23 schematically illustrates an example shape of an optical deflector 30Bb.

A planar image may be formed with a collection of connecting lines as illustrated in FIG. 22; an optical component may include optical surfaces 380 having curved reflection surfaces as illustrated in FIG. 23, whereby an even smaller number of optical components may be used to supply the light that produces a planar image.

Figure 24A:
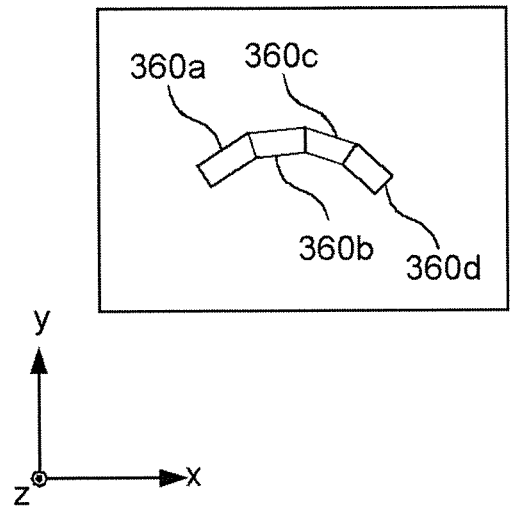
FIGS. 24A and 24B schematically illustrate examples of modifying the optical deflector 30Bb.
Figure 24B:
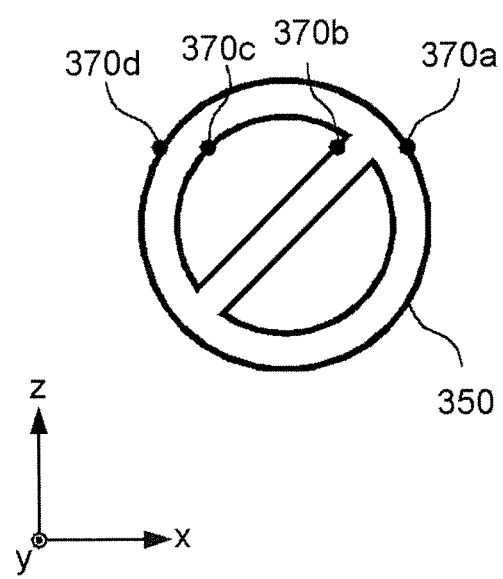

A modified version of the optical deflector 30Bb may include an optical component having an optical surface; FIG. 24A schematically illustrates an example shape of the optical surface projected onto the xy plane. FIG. 24B schematically illustrates a three-dimensional image 350 projected onto the plane 300 by the modified version of the optical deflector. In this modification example, the image includes four planar optical surfaces: an optical surface 360a, an optical surface 360b, an optical surface 360c, and an optical surface 360d. The optical surface 360a, the optical surface 360b, the optical surface 360c, and the optical surface 360d are linear prisms. The optical surfaces 360 intersect the rear surface 72 of the light guide plate 70 as lines.

The optical surfaces 360 reflect light incident thereon. Because the optical surfaces 360 are flat, the light reflected from the optical surfaces 360 in intersect the plane 300 at substantially a point. More specifically, the light from the optical surface 360a intersects the plane 300 at substantially the point 370a; the light from the optical surface 360 intersects the plane 300 at substantially the point 370b; the light from the optical surface 360c intersects the plane 300 at substantially the point 370c; and the light from the optical surface 360d intersects the plane 300 at substantially the point 370d. Thus, the points 370 where light from the optical surfaces intersects the plane 300 are mutually different. In this modification example, the light beams forming a plurality of points that produce an outline of the three-dimensional image 6B the output from the pension surface 71.

The four optical surfaces 360 are provided continuing along the x-axis direction in this modification example. Therefore, the intersecting line for this optical component and the xy plane are polygonal lines. As illustrated in FIG. 24A and FIG. 24B, a plurality of groups of flat reflection surfaces are required for the optical deflectors 30 in order to produce an image from any line.

Note that optical surfaces 360 do not need to be connected. A portion of the optical surfaces 360 may be connected, or all the optical surfaces 360 may be separated. For example, an optical component having three connected optical surfaces 360 and an optical component having a single optical surface 360 may be provided separately as illustrated in FIG. 24B. As another example, an optical component having two connected optical surfaces 360 and an optical component having two optical surfaces 360 may be provided separately. As yet another example, an optical component having two connected optical surfaces 360, an optical component having a single optical surface 360, and another optical component having a single optical surface 360 may be provided separately from each other.

Figure 25A:
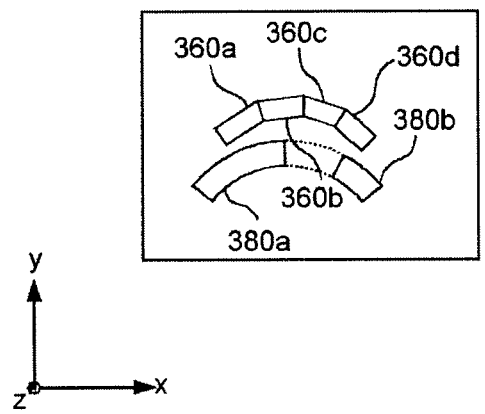
FIGS. 25A, 25B, and 25C schematically illustrate examples of modifying the optical deflector 30Bb.
Figure 25B:
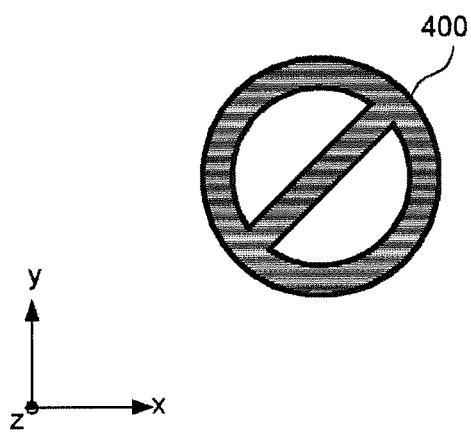
Figure 25:
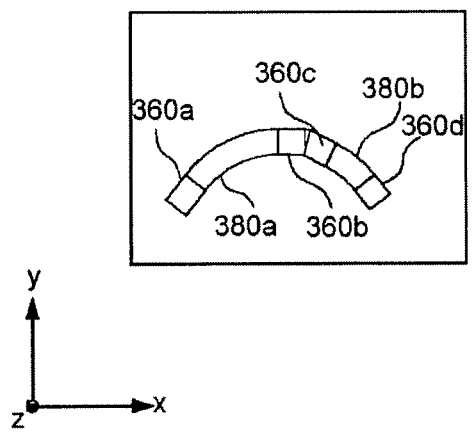

A modified version of the optical deflector 30Bb may include an optical component having an optical surface; FIG. 25A schematically illustrates an example shape of the optical surface projected onto the xy plane. FIG. 25B schematically illustrates a three-dimensional image 400 projected onto the plane 300 by the modified version of the optical deflector. In addition to the configuration of the optical deflector 30Bb described in relation to FIG. 23A, and the like, this modification example includes the configuration of the four optical surfaces 360 described pertaining to FIG. 24A. This modification example can create outlines of the three-dimensional image 6B in addition to the three-dimensional image 6B. Therefore, it is possible to emphasize the outline of the three-dimensional image 6B. Hereby, an observer is able to clearly recognize the shape of the three-dimensional image 6B.

FIG. 25C schematically illustrates an example shape of a modified version of the optical deflector 30Bb projected onto the xy plane. FIG. 25C is equivalent to moving the linear prisms constituting the optical surfaces 360 to the ends of the arc shaped prisms constituting the optical surfaces 380. More specifically, the optical surface 360a is provided at the end portion of the optical surface 380a toward the negative x axis direction; the optical surface 360b is provided at the end portion of the optical surface 380a toward the positive x axis direction; The optical surface 360c is provided at the end portion of the optical surface 380b toward the negative x axis direction; and the optical surface 360d is provided at the end portion of the optical surface 380b toward the positive x axis direction. In this manner, the optical surfaces 360 responsible for producing the outline of the three-dimensional image at both ends of each optical surface 380 along the x axis. Although the end portions of the optical surfaces 380 and the end portions of the optical surfaces 360 are connected in this modification example, the end portions of the optical surfaces 380 and the end portions of the optical surfaces 360 may be separate.

Figure 26A:
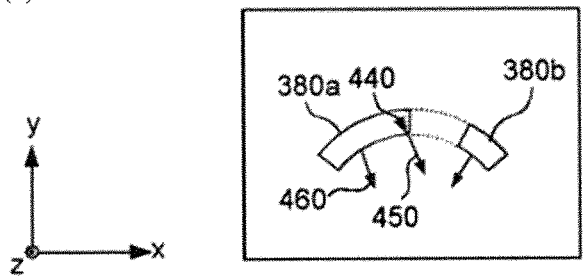
FIGS. 26A, 26B, 26C, and 26D schematically illustrate where a drip 440 may be present on the optical surface 380.

FIG. 26A schematically illustrates where a drip 440 may be created on the optical surface 380; the drip 440 may form when creating the optical surfaces 380 on the light guide plate 70. The spread angle of the light guided by the light guide plate 70 usually tends to increase with a large difference in the orientation of the surface with a drip and the orientation of the surface with no drip.

As illustrated in FIG. 26A, the outer shapes of the optical surfaces 380 are arcs in the xy plane with the center of curvature closer to the light source than the optical surfaces 380. Therefore, the normal line direction 450 from a surface of the drip 440 on the optical surfaces 380 differs slightly from the normal line direction 460 from a surface with no drip on the optical surfaces 380.

Figure 26B:
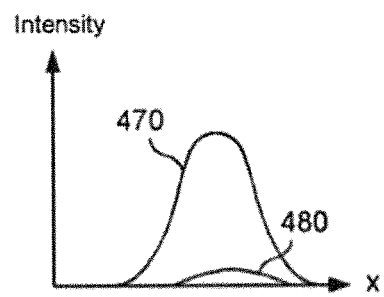

FIG. 26B schematically illustrates an intensity distribution in the x direction for light beams from the optical surfaces 380. As illustrated in FIG. 26B, the distribution 470 of light beams from a section with no drip on the optical surfaces 380 lies largely over the distribution 480 of light beams from the drip 440. Therefore, the drip 440 hardly affects the spread of the light beams from the optical surfaces 380.

Figure 26C:
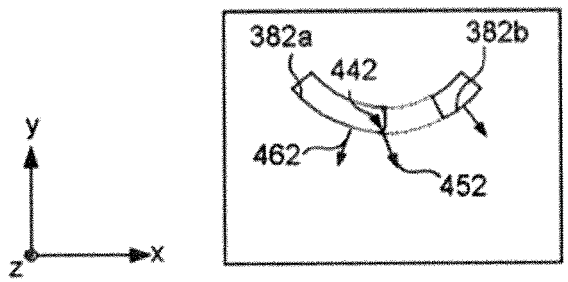

FIG. 26C schematically illustrates and optical surface 382 where the center of curvature of the contour is opposite the light source 20 relative to the optical surface. In this case, the normal line direction 452 from a surface of the drip 442 differs greatly from the normal line direction 462 from a surface with no drip on the optical surfaces 382.

Figure 26D:
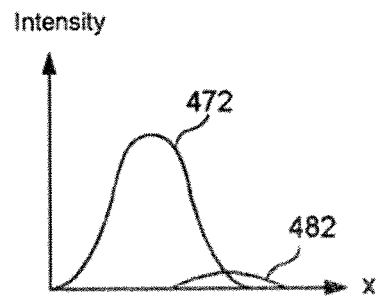

FIG. 26D schematically illustrates an intensity distribution in the x direction for light beams from the optical surfaces 380. As illustrated in FIG. 26D, one portion of the distribution 482 of the light beams from the drip 442 falls outside the distribution 472 from the section with no drip on the optical surfaces 380. Therefore, the drip 442 greatly affects the spread of the light beams from the optical surfaces 380. As above described, according to one or more embodiments of the present invention, the center of curvature of the optical surfaces 380 are closer to the light source 20.

Figure 27:
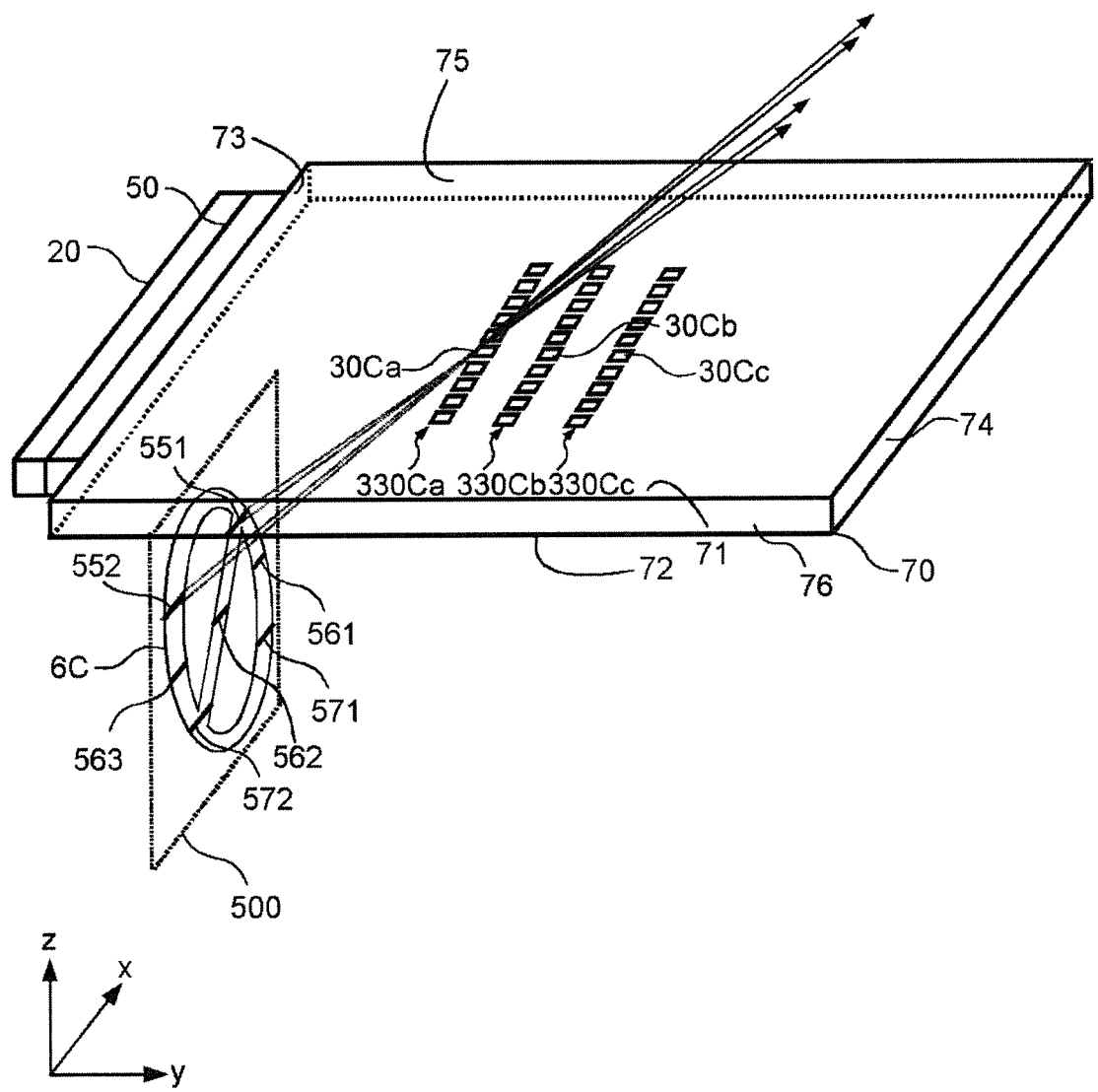
FIG. 27 schematically illustrates a display device 10C as an example of modifying the display device 10B.

FIG. 27 schematically illustrates a display device 10C as an example of modifying the display device 10B; the display device 10C projects a virtual three-dimensional image in a space opposite the emission surface 71. This example supposes that the three-dimensional image is located in a plane 500 orthogonal to the emission surface 71.

The display device 10B has a plurality of optical deflector element groups including an optical deflector group 330Ca, an optical deflector group 330Cb, and an optical deflector group 330Cc.

The optical deflector 30Ca deflects the light incident thereon causing the light to spread in a direction parallel to the xy plane, and causing two light beams to exit from the emission surface 71. Some light beams output from the emission surface due to the optical deflector 30Ca connect a point in the plane 500 on a line 551 and the optical deflector 30Ca. Other light beams output from the emission surface due to the optical deflector 30Ca connect a point in the plane 500 on a line 552 and the optical deflector 30Ca. Any of the optical deflectors in the optical deflector group 330Ca may cause the light beams connecting a point in the plane 500 on the line 551 to each of the optical deflectors 30, and the light beams connecting a point in the plane 500 on line 552 to each of the optical deflectors 30 to exit from the emission surface 71 similarly to the optical deflector 30Ca. The line 551 and the line 552 exist for the most part in a plane parallel to the xy plane and form a portion of the three-dimensional image 6C. Each of the optical deflectors 30 belonging to the optical deflector group 330Ca thus spreads the light incident thereon that has an intensity distribution corresponding to the line 551 and the line 552; the light is spread in the x axis direction within a plane parallel to the emission surface 71 and caused to exit from the emission surface 71. Hereby, light from the plurality of optical deflectors 30 belonging to the optical deflector group 330Ca arranged along the x axis direction becomes light that radiates from an image of the line 551 and the line 552.

The optical deflector 30Cb deflects the light incident thereon causing the light to spread in a direction parallel to the xy plane, and causing three light beams to exit from the emission surface 71. The three light beams output from the emission surface 71 are namely light beams connecting a point in the plane 500 on a line 561 and the optical deflector 30Cb, light beams connecting a point in the plane 500 on a line 562 and the optical deflector 30Cb, and light beams connecting a point in the plane 500 on a line 563 and the optical deflector 30Cb. Any of the optical deflectors in the optical deflector group 330Cb may cause the light beams connecting a point in the plane 500 on the line 561 to each of the optical deflectors 30, the light beams connecting a point in the plane 500 on the line 562 to each of the optical deflectors 30, and the light beams connecting a point in the plane 500 on line 563 to each of the optical deflectors 30 to exit from the emission surface 71 similarly to the optical deflector 30Cb. The line 561, the line 562, and the line 563 exist for the most part in a plane parallel to the xy plane and form a portion of the three-dimensional image 6C. Thus, each of the optical deflectors 30 belonging to the optical deflector group 330Cb spreads the light incident thereon that has an intensity distribution corresponding to the line 561, the line 562, and the line 563; the light is spread in the x axis direction within a plane parallel to the emission surface 71 and caused to exit from the emission surface 71. Hereby, light from the plurality of optical deflectors 30 belonging to the optical deflector group 330Cb arranged along the x axis direction becomes light that radiates from an image of the line 561, the line 562, and the line 563.

The optical deflector 30Cc deflects the light incident thereon causing the light to spread in a direction parallel to the xy plane, and causing two light beams to exit from the emission surface 71. The two light beams output from the emission surface 71 are namely light beams connecting a point in the plane 500 on a line 571 and the optical deflector 30Cc and light beams connecting a point in the plane 500 on a line 572 and the optical deflector 30Cc. Any of the optical deflectors in the optical deflector group 330Cc may cause the light beams connecting a point in the plane 500 on the line 571 to each of the optical deflectors 30, and the light beams connecting a point in the plane 500 on line 572 to each of the optical deflectors 30 to exit from the emission surface 71 similarly to the optical deflector 30Cc. The line 571 and the line 572 exist for the most part in a plane parallel to the xy plane and form a portion of the three-dimensional image 6C. Each of the optical deflectors 30 belonging to the optical deflector group 330Cc thus spreads the light incident thereon that has an intensity distribution corresponding to the line 571 and the line 572; the light is spread in the x axis direction within a plane parallel to the emission surface 71 and caused to exit from the emission surface 71. Hereby, light from the plurality of optical deflectors 30 belonging to the optical deflector group 330Cc arranged along the x axis direction becomes light that radiates from an image of the line 571 and the line 572.

Thus, the display device 10C gathers light beams from the two-dimensionally arranged plurality of optical deflectors to present light beams that radiate from the image 6B in the space near an observer. The location at which the three-dimensional image 6C is formed is opposite the emission surface 71 in the display device 10C; the plane 500 in which the three-dimensional image 6C is formed does not intersect with the light beams output from the emission surface 71. However, similarly to the display device 10C, light beams output from the emission surface by way of the optical deflectors 30 also connect a point on a line forming the three-dimensional image and the optical deflector 30 in the display device 10B. Therefore, the identical configurations pertaining to the display device 10B may be adopted in the display device 10C. Thus, further detailed description of the display device 10C is omitted.

The above describes examples of producing a three-dimensional image in a plane orthogonal to the emission surface with reference to FIG. 20 through FIG. 27. However, the location of the three-dimensional image is not limited to a within a plane perpendicular to the emission surface 71.

The location of the three-dimensional image is not limited as long as the same is not within a plane parallel to the emission surface 71.

Again, the optical deflectors 30 may be provided as a matrix in the xy plane as above described. For instance, the optical deflectors 30 may be provided at equal pitch in the x axis direction and at equal pitch in the y axis direction. Here the pitch of the optical deflectors 30 in the x axis direction may be the same or different from the pitch in the y axis direction. The pitch of the optical deflectors 30 may be smaller in the x axis direction than in the y axis direction. The density of the points in the x axis direction in the three-dimensional image 6 increases when the pitch of the optical deflectors 30 is smaller in the x axis direction than in the y axis direction. Therefore, the points forming the three-dimensional image 6 are connected along the x-axis direction allowing those points to be more easily perceived as a line. Hereby, an observer can easily recognize both ends of the line and more easily perceive the form of the three-dimensional image 6.

The pitch of the optical deflectors 30 may be varied within the xy plane. Varying the pitch of the optical deflectors 30 in the xy plane makes it possible to modify the resolution of the three-dimensional image 6 in each region. Additionally, the optical deflectors 30 need not be provided regularly. The optical deflectors 30 may be provided randomly within the xy plane.

Figure 28A:
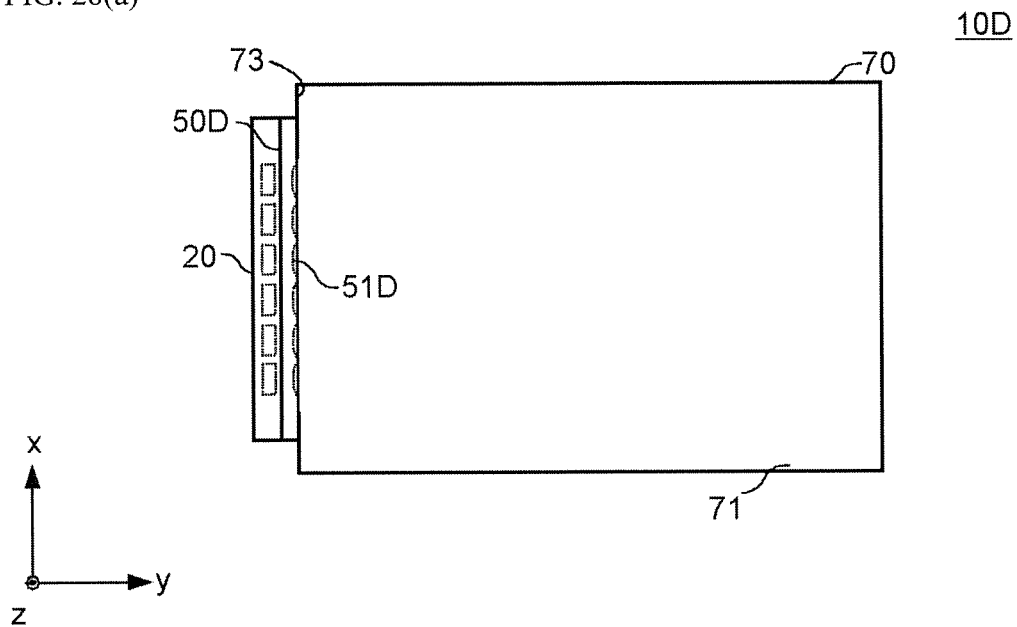
FIGS. 28A and 28B are plan views along the xy plane of the display device to illustrate an example of modifying the display device 10B.
Figure 28B:
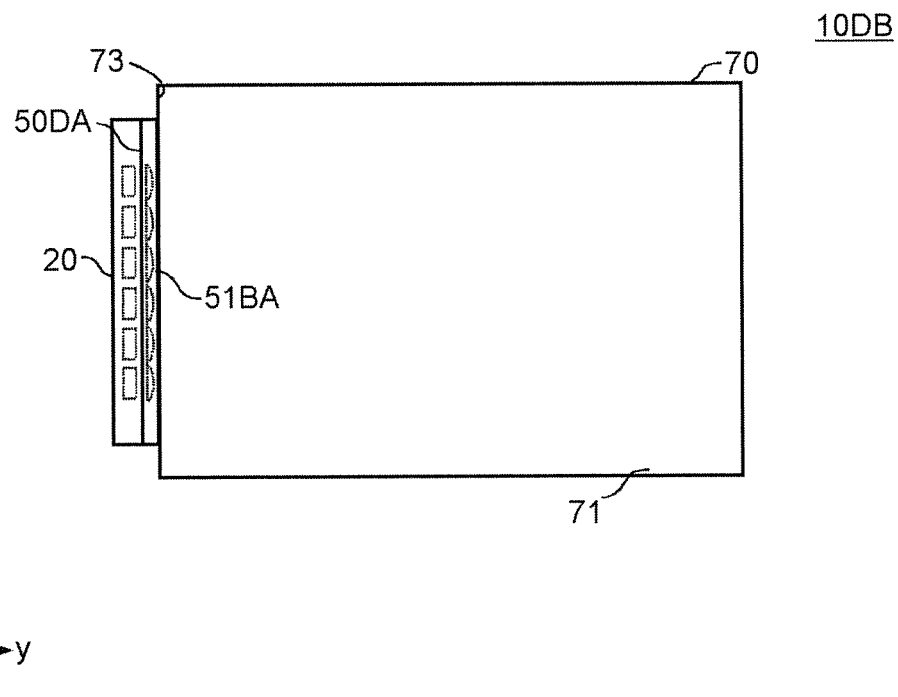

FIG. 28A is a plan view along the xy plane of the display device 10D to illustrate an example of modifying the display device 10B. The display device 10D differs from the display device 10B in that the display device 10D is equipped with a light-incidence tuning portion 50D that includes a plurality of integrally molded lenses 51D on the first edge 73. The lenses 51D are convex portions protruding from the first edge 73 toward the negative y axis direction in the xy plane.

The lenses 51BA are cylindrical planoconvex lenses and may be used instead of the lenses 51B in the display device 10DB. The lenses 51BA protrude toward the negative y axis direction in the xy plane. The lenses 51B may be replaced by cylindrical planoconvex lenses which protrude toward the negative y axis direction in the xy plane.

Figure 29A:
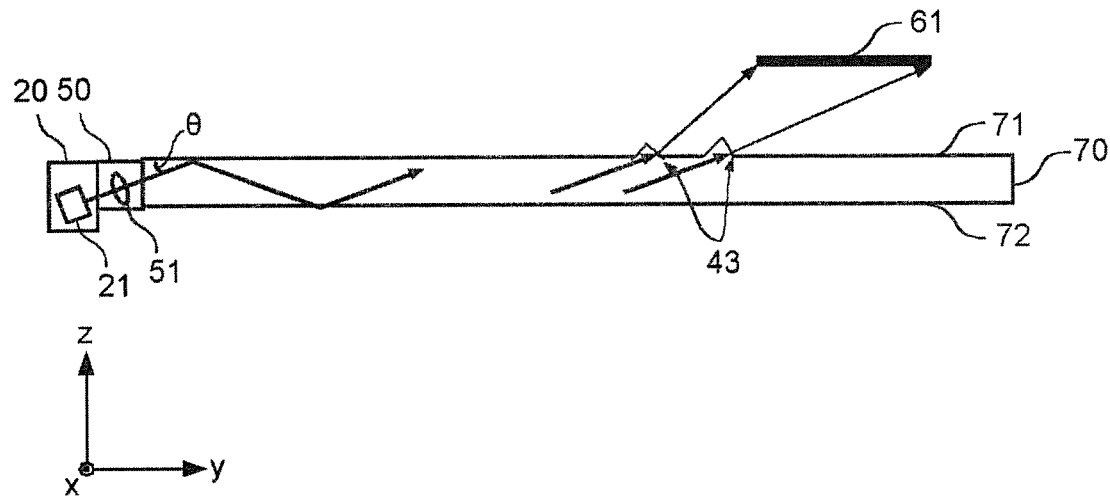
FIGS. 29A and 29B are cross-sectional views along the yz plane of a display device provided with a refraction surface to illustrate an example of modifying the optical deflector 30.
Figure 29B:
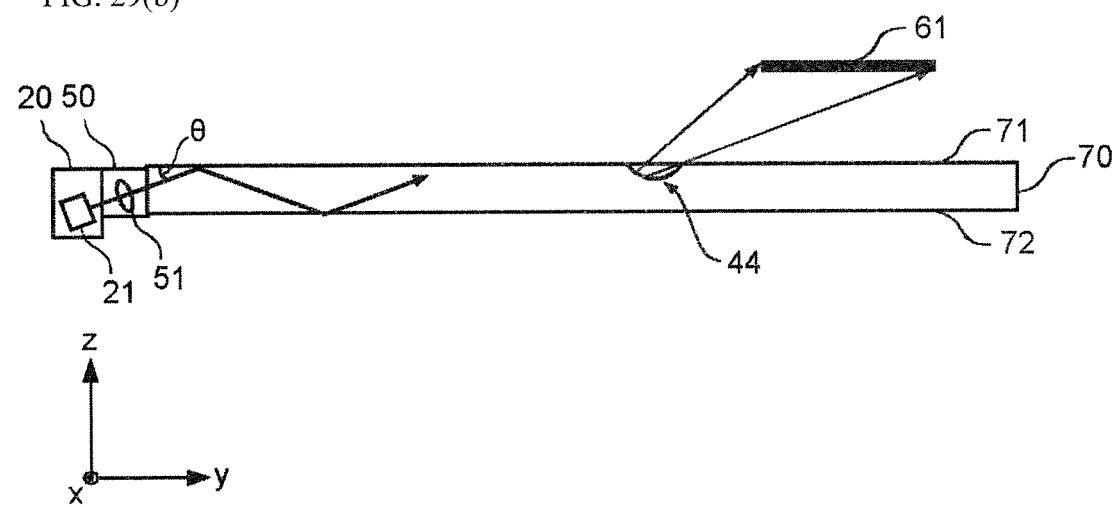

Above, a linear prism or an arc-shaped prism, as well as an optical surface forming a Fresnel lens are provided as examples of optical surfaces functioning as the optical deflectors 30. A diffraction surface such as a diffraction grating may be adopted as the optical surface functioning as the optical deflectors 30. Any of these optical surfaces may be inclined relative to the emission surface 71. The diffraction surface may be provided on the rear surface 72 or on the emission surface 71 when the same is adopted as the optical deflector 30. Beyond reflection and diffraction, an optical surface may be used that deflects light by refracting the light from the light source. FIG. 29A is a cross-sectional view along the yz plane of a display device E provided with a refraction surface 43 to illustrate an example of modifying a part of the optical deflector 30. FIG. 29A schematically illustrates the yz plane of a display device 10F provided with a refraction surface 44 to illustrate an example of modifying a part of the optical deflector 30. As illustrated in FIG. 29A and FIG. 29B, the refraction surface 43 is provided on the emission surface 71.

The display device 10 and the modifications thereof described above are configured such that each of the optical deflectors provided two dimensionally in a plane parallel to the emission surface of the light guide plate 70 supply light forming images at a plurality of locations in the three-dimensional image. Therefore, the three-dimensional image may be viewed from a wide range. At least a portion of the three-dimensional image may also be formed as a plane and not necessarily as a point.

The present invention is hereby described by way of embodiments; however, the technical scope of the present invention is not limited to the above-described embodiments. It is obvious to a person skilled in the art that the above described embodiments can be modified or improved in various ways. The scope of the claims makes it clear whether such kind of modifications or improvements to the embodiments is within the technical scope of the present invention.

It should be noted that unless explicitly stated with terms such as "before", "prior to", and the like, and unless the output of a prior process is used in a subsequent process, the sequence of execution of operations procedures, steps, and stages within the devices, systems, programs, and methods expressed in the scope of the claims, the specification, and the drawings, may be executed any order as desired. The terms "first", "next", and the like are used for convenience when describing operational flows within the scope of the claims, the specification, and in the drawings, and does not mean that execution in this order is required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An optical device comprising:
a light guide plate configured to guide light within a plane parallel to an emission surface thereof; and
a plurality of optical deflectors arranged two-dimensionally within a plane parallel to the emission surface,
wherein each of the optical deflectors comprises a reflective element, deflects light propagating through the light guide plate, and causes the emission surface to output light forming an image in a space,
wherein reflectance of the reflective element in each of the optical deflectors are mutually different in accordance with location of the image, and
wherein each of the optical deflectors is configured to:
spread the light incident thereon that has an intensity distribution corresponding to an image in a direction orthogonal to the light guide direction of the light guide plate in a plane parallel to the emission surface, and
cause the emission surface to output said light which groups the light from the plurality of optical deflectors arranged along a direction orthogonal to the light guide direction, such that light radiating from the image is formed.

2. The optical device according to claim 1, wherein each of the optical deflectors is provided with a single group or a plurality of groups of reflective, refractive, or diffractive deflection surfaces on a surface of or inside the light guide plate, and is inclined relative to the emission surface.

3. The optical device according to claim 2, wherein at least one of the deflection surfaces is configured to include a plurality of planar or curved surfaces oriented in different directions.

4. The optical device according to claim 3, wherein at least one of said deflection surfaces is configured to extend in a direction orthogonal to the light guide direction of the light guide plate, and to have polygonal lines or curved lines when projected onto a plane parallel to the emission surface.

5. The optical device according to claim 2, wherein at least one of said deflection surfaces is configured to extend in a direction orthogonal to the light guide direction of the light guide plate, and to have polygonal lines or curved lines when projected onto a plane parallel to the emission surface.

6. The optical device according to claim 1, wherein at least a portion of the plurality of optical deflectors is configured to include a plurality of deflection surfaces extending linearly when the optical deflector is projected onto a plane parallel to the emission surface.

7. The optical device according to claim 1, wherein at least a portion of the plurality of optical deflectors is configured to include a plurality of deflection surfaces extending along a curve and one or more linear deflection surfaces when the optical deflector is projected onto a plane parallel to the emission surface.

8. The optical device according to claim 1, where in at least a portion of the plurality of optical deflectors is configured to include a deflection surface forming a part of a Fresnel lens arranged at a location corresponding to the image.

9. The optical device according to claim 1, wherein at least a portion of the plurality of optical deflectors is configured to include one or more deflection surfaces having a shape following an arc when the optical deflector is projected onto a plane parallel to the emission surface.

10. The optical device according to claim 1,
wherein the plurality of deflection surfaces are formed substantially uniformly on the emission surface or a surface opposite the emission surface of the light guide plate,
wherein the deflection surfaces are configured to spread light incident thereon in a range containing the image and cause the emission surface to output said light,
wherein the optical device further comprises:
a photo-reflective material provided on a portion of the plurality of deflection surfaces uniformly provided, and
wherein the plurality of uniformly formed deflection surfaces which are provided with the reflective material form the at least one portion of the plurality of optical deflectors.

11. The optical device according to claim 1, further comprising:
an optical component configured to include at least a portion of the plurality of optical deflectors, and arranged on the emission surface or a surface opposite the emission surface.

12. The optical device according to claim 1,
wherein the plurality of deflection surfaces are formed substantially uniformly on the emission surface or a surface opposite the emission surface of the light guide plate,
wherein the deflection surfaces is configured to spread light incident thereon in a range containing the image and cause the emission surface to output said light,
wherein the optical device further comprises:
an optical component having a refractive index substantially identical to the refractive index of the light guide plate, and configured with a surface in contact with a portion of the plurality of uniformly formed deflection surfaces, and
wherein the plurality of uniformly provided deflection surfaces not in contact with the surface of the optical component form the at least one portion of the plurality of optical deflectors.

13. The optical device according claim 1, wherein at least a portion of the plurality of optical deflectors is configured to include a deflection surface having a shape following an arc with a center of curvature toward a light source when the optical deflector is projected onto a plane parallel to the emission surface.

14. The optical device according to claim 1, further comprising a light source.

15. An optical device comprising:
a light guide plate configured to guide light within a plane parallel to an emission surface thereof; and
a plurality of optical deflectors arranged two-dimensionally within a plane parallel to the emission surface,
wherein each of the optical deflectors comprises a reflective element, deflects light propagating through the light guide plate, and causes the emission surface to output light forming an image in a space,
wherein reflectance of the reflective element in each of the optical deflectors are mutually different in accordance with location of the image, and
wherein each of the optical deflectors is configured to:
spread the light incident thereon that has an intensity distribution corresponding to the image two-dimensionally, and
cause the emission surface to output said light which groups the light from three or more optical deflectors on different straight lines, such that light radiating from the image is formed.

16. The optical device according to claim 15, wherein each of the optical deflectors is provided with a single group or a plurality of groups of reflective, refractive, or diffractive deflection surfaces on a surface of or inside the light guide plate, and is inclined relative to the emission surface.

17. The optical device according to claim 16, wherein at least one of the deflection surfaces is configured to include a plurality of planar or curved surfaces oriented in different directions.

18. The optical device according to claim 17, wherein at least one of said deflection surfaces is configured to extend in a direction orthogonal to the light guide direction of the light guide plate, and to have polygonal lines or curved lines when projected onto a plane parallel to the emission surface.

19. The optical device according to claim 16, wherein at least one of said deflection surfaces is configured to extend in a direction orthogonal to the light guide direction of the light guide plate, and to have polygonal lines or curved lines when projected onto a plane parallel to the emission surface.

20. The optical device according to claim 15, wherein at least a portion of the plurality of optical deflectors is configured to include a plurality of deflection surfaces extending linearly when the optical deflector is projected onto a plane parallel to the emission surface.

* * * * *